(12) United States Patent
Scanlon

(10) Patent No.: US 6,970,267 B1
(45) Date of Patent: Nov. 29, 2005

(54) GRAY SCALE OPTICAL MARK READER

(75) Inventor: Edward F. Scanlon, Enfield, CT (US)

(73) Assignee: Scan-Optics Inc., Manchester, CT (US)

( * ) Notice: Subject to any disclaimer, the term of this patent is extended or adjusted under 35 U.S.C. 154(b) by 311 days.

(21) Appl. No.: 10/041,166

(22) Filed: Jan. 8, 2002

Related U.S. Application Data

(60) Provisional application No. 60/261,570, filed on Jan. 12, 2001.

(51) Int. Cl.$^7$ ............................................. G06F 15/00
(52) U.S. Cl. ........................................ 358/1.4; 358/1.9
(58) Field of Search ........................... 358/1.1, 1.4, 1.5, 358/1.7, 1.9, 1.18, 474, 528; 382/151; 443/353, 443/355, 363; 473/70, 71

(56) References Cited

U.S. PATENT DOCUMENTS

| | | | | |
|---|---|---|---|---|
| 3,737,628 A | * | 6/1973 | Azure, Jr. | .................... 434/355 |
| 3,900,961 A | * | 8/1975 | Sokolski et al. | ............. 434/363 |
| 4,943,239 A | * | 7/1990 | Koslin | ........................ 434/353 |
| 5,102,341 A | * | 4/1992 | Koslin | ........................ 434/353 |
| 5,416,849 A | * | 5/1995 | Huang | ......................... 382/173 |
| 6,181,909 B1 | * | 1/2001 | Burstein et al. | ............. 434/353 |
| 6,210,171 B1 | * | 4/2001 | Epstein et al. | .............. 434/346 |
| 6,418,409 B1 | * | 7/2002 | Metzger | ...................... 704/240 |

* cited by examiner

*Primary Examiner*—Gabriel Garcia
(74) *Attorney, Agent, or Firm*—Alix, Yale & Ristas, LLP

(57) ABSTRACT

In a broad aspect of the invention, the master printed form is scanned and processed according to a forms definition program to produce a virtual form file comprising a virtual layout of the significant regions such as bubble targets of printed material on the form, on a virtual coordinate system. Production forms that have been marked by subjects (e.g., students, voters, survey respondents, etc.), are then scanned to produce a marked form file of gray scale darkness values for each marked form. The marked form file and the virtual form file, are compared and processed to determine the location and spatial relationships of the marks on the marked form, in relation to the virtual coordinate system of the virtual form. The raw scan of each marked form is also processed to determine whether darkened areas on the marked form image should be interpreted as intentional responses from the subject, at the virtual coordinates where targets are located on the virtual form.

10 Claims, 17 Drawing Sheets

| DocumentName | REFs | OMRs | Image File Template | Page |
|---|---|---|---|---|
| GSCHOOL | 4 | 5 | D:\SOCONF\JOBS\1044502\1044502.tif | 1 |
| GCLASS | 4 | 5 | D:\SOCONF\JOBS\1044502\1044502.tif | 3 |
| GPAGE01 | 4 | 12 | D:\SOCONF\JOBS\1044502\1044502.tif | 5 |
| GPAGE02 | 4 | 56 | D:\SOCONF\JOBS\1044502\1044502.tif | 6 |
| GPAGE03 | 4 | 40 | D:\SOCONF\JOBS\1044502\1044502.tif | 7 |
| GPAGE13 | 4 | 15 | D:\SOCONF\JOBS\1044502\1044502.tif | 17 |
| GPAGE14 | 4 | 50 | D:\SOCONF\JOBS\1044502\1044502.tif | 18 |
| GPAGE24 | 4 | 15 | D:\SOCONF\JOBS\1044502\1044502.tif | 28 |

Figure 3

GRAY SCALE OPTICAL MARK READER

RELATED APPLICATION

This application claims the benefit under 35 USC § 119(e) of provisional patent application 60/261,570 filed Jan. 12, 2001.

BACKGROUND OF THE INVENTION

The present invention relates to the automated scoring of so-called "bubble" forms or the like, whereby each of a multiplicity of end users such as students, voters, and questionnaire respondents, enters marks on a standard form associated with the individual, to indicate the specific choices from among those offered on the form. The marks are typically entered by darkening (filling in) preprinted circles or ellipses with a pencil. Inevitably, some of the respondents apply very light pressure on the pencil and therefor produce a very light mark. The marks made by other respondents may either extend out of the designated target, or partially within and partially outside of the target. In other cases, a stray mark may inadvertently be made near a target. These deviations give rise to the need for interpretation of the intent of the user. This is in addition to deviations that arise from imperfect printing of the form, and misalignment or bending of the form as it passes through the scoring system.

Under the present state of the art, bubble forms are processed with highly specialized scanners that sense the marked state of the bubble targets using a fixed array of LED sensors. These scanners do not work by producing an electronic image reproduction of the contents of the forms; they merely sense the darkness levels of certain predefined fixed locations of the forms. On a form page of dimension 8½×11 inches, the typical bubble density is approximately six bubbles per inch in each of the page dimensions. This is similar to the LED sensor density and thus, one LED sensor is associated with each column of bubble locations. In order to achieve and maintain their accuracy rates, these scanners require extremely high quality paper with very precise printing and cutting. Production of such forms is very expensive and is usually available only from a single source, namely, the same company that produces the LED scanner.

SUMMARY OF THE INVENTION

The novelty of the present invention is that it uses electronic image capturing technology in conjunction with specialized image processing techniques for performing the scoring. The system and method of the present invention will be referred to as the Gray Scale Optical Mark Reader (GSOMR), which is implemented through a combination of computer hardware and software. The term "software" or "program" as used herein should be understood as including control logic and/or digital databases permanently or temporarily resident in hardware.

This new invention works in conjunction with an image capture scanner that produces an electronic reproduction of each form. The electronic images are processed to produce scoring results that achieve an accuracy rate equal to or better than those achieved by the LED scanners. Various makes and models of scanners may be used with the invention, but the most accurate results are achieved when using scanners that produce gray-scale image output. It is therefor not necessary to require expensive paper and printing process as is required by the LED scanners. Thus, paper and printing costs can be greatly reduced without sacrificing accuracy.

In a broad aspect of the invention, the master printed form is scanned and processed according to a forms definition program to produce a virtual form file comprising a virtual layout of the significant regions such as bubble targets of printed material on the form, on a virtual coordinate system. Production forms that have been marked by subjects (e.g., students, voters, survey respondents, etc.), are then scanned to produce a marked form file of gray scale darkness values for each marked form. The marked form file and the virtual form file, are compared and processed to determine the location and spatial relationships of the marks on the marked form, in relation to the virtual coordinate system of the virtual form. The raw scan of each marked form is also processed to determine whether darkened areas on the marked form image should be interpreted as intentional responses from the subject, at the virtual coordinates where targets are located on the virtual form.

The master preprinted form preferably includes a plurality, typically four, preprinted reference marks at, e.g., the corners, as do the forms to be marked by the subjects. Because the reference marks are relatively accurately positioned on both the master pre-printed form and the pre-printed form given to each subject, the coordinates of the reference marks on both the preprinted forms and in the virtual coordinate system are established with a high degree of accuracy. To the extent the coordinates of the reference marks in the marked form file differ form the coordinates of the reference mark of the virtual form (or, master template) in the virtual coordinate system, adjustment can be made for the deviations arising from skew, shift, stretch (scale), and slant, such that the coordinates associated with each target on the scanned marked form file can be appropriately offset or adjusted relateive to the coordinates of the master template form in the virtual coordinate system. In this manner, marks made by the subject on the form, as represented by gray scale darkness values in the marked form file, can be better associated with a target location and employed in various interpreting rules to confirm whether a score for a particular target should have one or the other of a binary value, e.g., "intentionally marked" or "intentionally left blank". The score for a target or field could instead be indeterminate due to excessive uncertainty or to an invalid relation with other targets or fields. The term scored value should be understood in the most general sense, as indicative of an evaluation made of an active, passive, positive or negative, indeterminate or invalid response to e.g., a bubble.

Furthermore, the relatively high resolution of the scanned image, e.g., hundreds of positions (pixels) per inch, permits gray scale darkness sampling in a region or zone surrounding each target location (as offset or adjusted) to ascertain the most likely center of a candidate mark, and to ascribe a level of darkness to the candidate mark, which in combination with the imputed distance from the center to the adjusted target location, provide inputs to a logic operation for concluding whether or not a candidate mark is of sufficient darkness and close enough to the expected location, to warrant an interpretation that the mark is an intentional response.

Many of the interpretive variables are under the control of the user, i.e., the entity having the responsibility for scoring the marked forms. These interpretive rules are specified for the virtual or master template form file obtained from the master preprinted form, before the marked forms are scanned and scored. The variables associated with defining the virtual form or master template, and with interpreting candidate marks, are preferably implemented by such user, with the aid of a graphical user interface whereby various tools can be employed on the virtual layout of the preprinted form on the virtual coordinate system.

The major advantages of this new process over the state of the art include:

(1) Does not require specialized LED-array scanner; may be used with many various image capture scanners available on the market.
(2) Does not require any special expensive paper or printing. Form printing can be done inexpensively by local commercial printers.
(3) Extremely high accuracy rates.
(4) Flexible and easy to use forms definition tool.
(5) Greater flexibility in form design: Target placements on forms is not restricted to predefined columnar locations to accommodate the fixed array of LED sensors and targets are not restricted to a single size and shape.

BRIEF DESCRIPTION OF THE DRAWINGS

FIG. 1 is a representation of a preprinted form containing a multiplicity of bubbles or targets, to be used as a master form by the user in setting an operational implimentation of the invention, and used by a subject, such as a student, to selectively mark targets with a lead pencil or the like to indicate responses to questions or the like;

FIG. 3 is a screen shot showing an example of the OmrGen Job dialog after a job has been loaded;

DESCRIPTION OF THE PREFERRED EMBODIMENTS

I. System Overview

The system and method according to the invention can be implemented in a variety of contexts; with only the preferred embodiment described in the present specification. This preferred embodiment is in the context of a multi-page student examination booklet with associated bubble targets, which the student's mark with an ordinary lead pencil to indicate the selected responses to the examination questions. A commercial version of the invention is, as of the filing date of this application, being marketed under the "AccuScore" trademark, by Scan-Optics, Inc. and the terminology used in the present specification is derived from such commercial product. It should be understood, however, that the terminology, labels, and screen displays described in the present application are for illustrative purposes only and that the claims, not the preferred embodiment as described, define the scope of patent rights.

Figure 1:
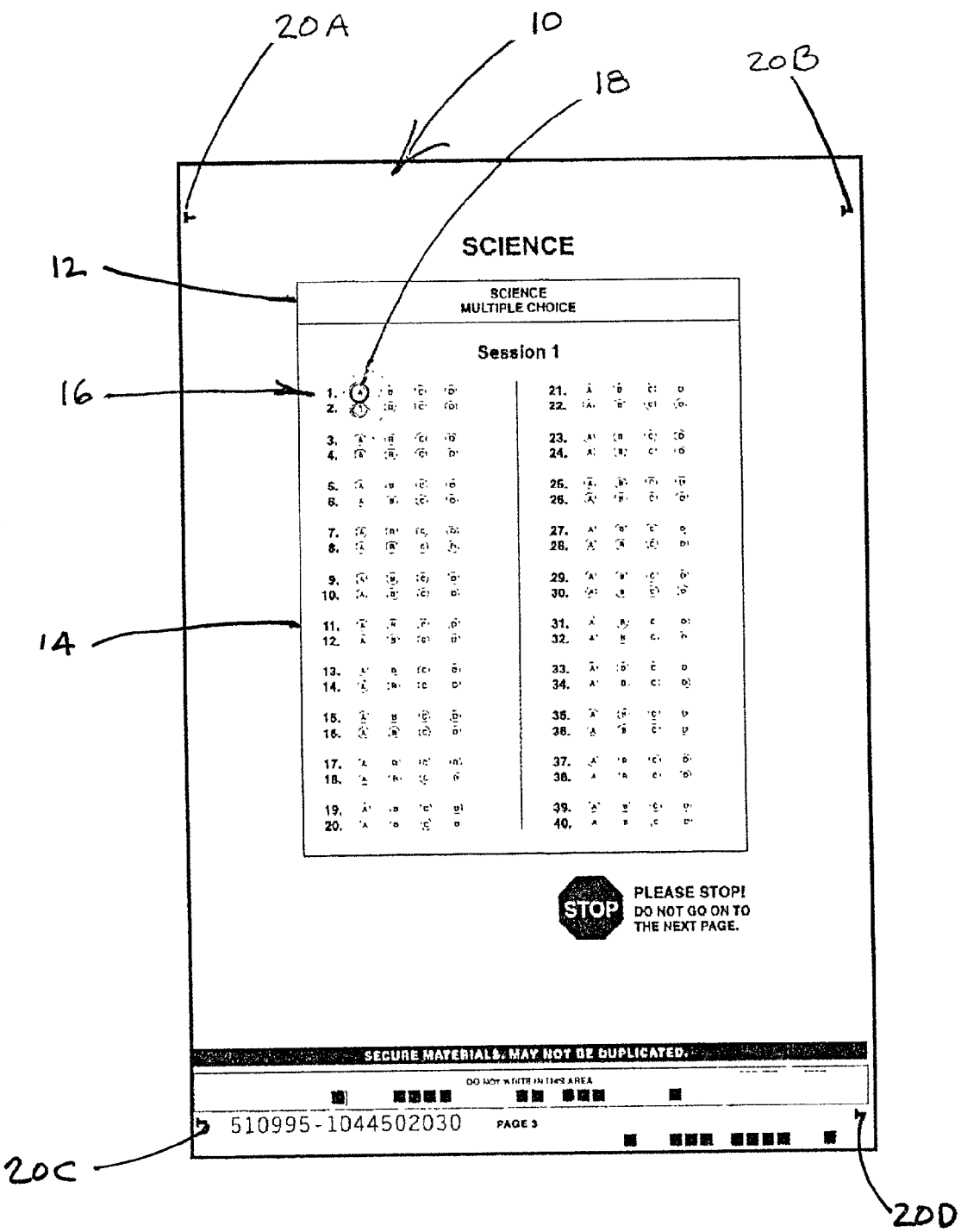

FIG. 1 is a representation of a one page, preprinted master form 10 which may contain a plurality of sections such as 12, 14. Section 14 has a multiplicity of target groups, one of which is shown at 16, consisting of a plurality of targets 18. In this example, the target group 16 is associated with question number 1 and each of the targets A, B, C and D is indicated by a preprinted circle with letters centered therein. It is convenient to consider the relevant information content of a section o be an optical mark read field (OMR Field), i.e., a related set of targets that produce a single answer for its output, in this instance, the number of correct answers or responses for the questions in session one. Thus, each target group 16 is a subset of an OMR Field 14, and each target 18 is a subset of a target group 16.

The master form has a plurality, preferably four, accurately positioned reference marks 20A, 20B, 20C, and 20D preprinted with non-dropout ink, which will produce a vivid dark gray scale image when scanned. On the other hand, the individual targets 18 are preferably preprinted in drop out ink which will be invisible in a drop out scanner.

According to the invention, the master form 10 can be considered as a two-dimensional rectilinear object on which is superimposed a coordinate system such that each preprinted item e.g., reference mark or target can be located according to a pair of coordinates. Moreover, according to the present invention the location of an item is preferably expressed as a rectangular area specification, in the form of a set of four real numbers that specify the locations of the top, bottom, left, and right sides of a rectangle (or axis intercepts of an ellipse) in cartesian coordinates. This provides the basis for a target definition according to the invention, which is a rectangular or elliptical area specification that defines the location and size of an area to be sensed by the scoring program to determine whether a mark (either a reference mark or a student's pencil mark) is present at a single target such as 18.

In a typical student examination booklet, a plurality of forms are provided, with some sections calling for the student to enter the name, date of birth, sex, race/ethnicity, social security number, or other identifying or demographic information, in addition to the substantive test covering a number of curriculum areas. It should be understood that some of the terms in this patent specification may be used interchangeably with reference to a job having multiple pages and mixed contents, or a job having a single page with substantially more homogeneous content. The latter is a subset of the former. In general, from the point of view of the user who is to score test booklets, a job consists of all the pages marked by the students, that will be processed together in a batch. This typically includes all the pages of a booklet, plus any school or class headers and the like that may be scanned with the booklet.

Figure 2A:
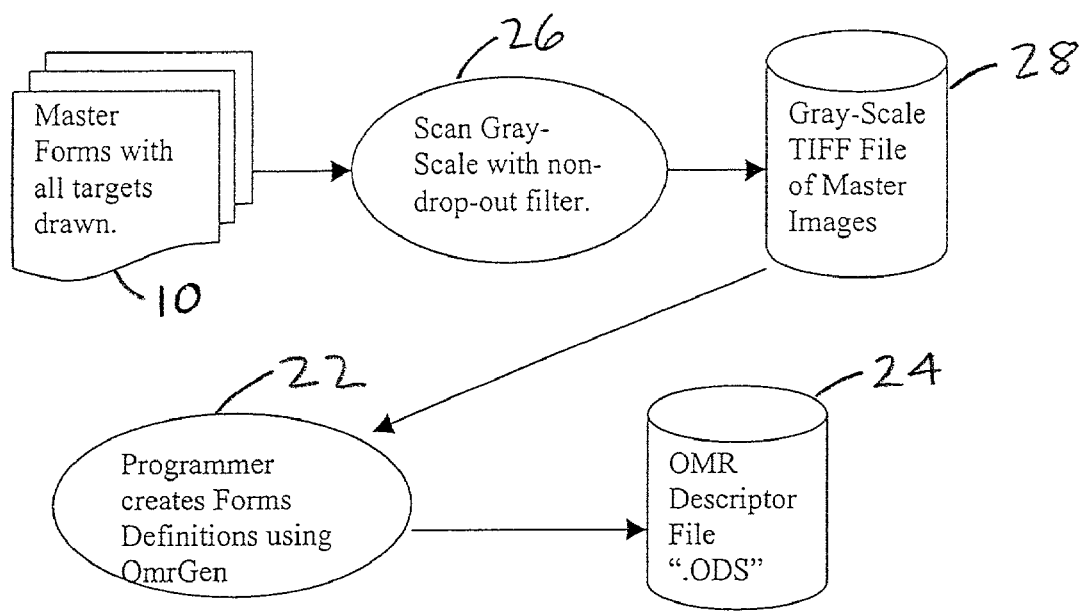
FIG. 2A in a schematic of the steps by which the OMR Form Descriptor file is generated based on the master forms and FIG. 2B in a schematics of the steps for the scoring of respondents' marked forms.
Figure 2B:
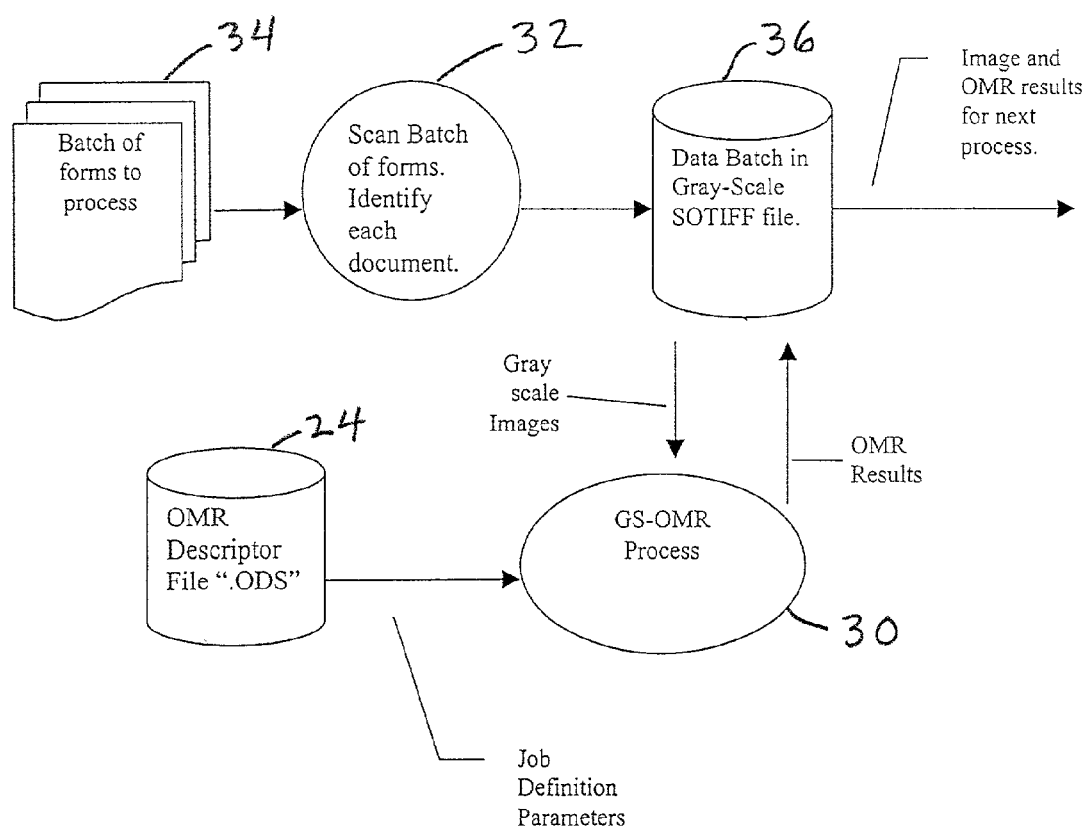

The system according to the preferred embodiment includes two major program components. The first is the form definition tool called OmrGen. This component is used to precisely define the locations and interpretations of each bubble target on each form type to be processed. The other component is the run-time scoring engine that takes the scanned images of marked booklets from the scanner, and the forms definition information from the OmrGen program, and produces the score results. FIGS. 2A and 2B are schematics of the steps by which the OMR Descriptor file is generated based on the master forms, and the steps for the scoring of respondents' marked forms, respectively.

OmrGen 22 is a Forms Definition Tool, similar in some respects to the ScanGen™ software tool available from Scan Optics, Inc. of Manchester, Conn., but modified specifically for creating Reference Mark and OMR Field definitions required by the GS-OMR run-time engine. This program preferably runs on a PC at thr user's facility. Unlike ScanGen, OmrGen will actually locate the OMR and Reference Mark targets on the master image or template as the user (application programmer) is defining the search areas. This approach greatly simplifies the form definition process as well as greatly enhancing its accuracy. Additionally, unlike ScanGen, OmrGen allows the defining of the actual OMR field type (e.g. multiple choice producing a single answer such as Y/N or A/B/C/D; or a 2-D-array of targets producing a string). The output of the OmrGen tool is an "Omr Descriptor" file 24 with the file extension ".ODS". The ODS file is an ASCII file arranged in the same format as the ScanGen DES file, but with the additional parameters that are required for the GS-OMR module.

The Forms Definition process consists first of scanning a master image of each of the pages 10 that will comprise the job. For the best and easiest results, all the OMR target bubbles 18 must be clearly visible on the master images 26. The master images should then be scanned in gray-scale using a non-dropout filter in order to capture the "background" ink. For added convenience, all pages of a single job may be scanned into one single multi-image TIFF file 28. Using OmrGen 22 the user programmer creates a new job and selects the master image file and page number for each page being defined.

The purpose of the GS-OMR run-time engine 30 is to process the batches of production images 32 of the students' marked forms 34 according to the forms definitions contained in the OMR Job Descriptor ".ODS" files. The OMR field results produced by GS-OMR are written back into a new header or the like in the SOTIFF file 36.

The GS-OMR run-time engine 30 runs as a stand-alone and basically unattended process on a PC at the user's facility. The two main inputs to this module are multi-image TIFF files 36, such as those generated by the Series 9000 scanner available from Scan Optics, Inc, (SOTIFF files) and the OMR Job Descriptor ".ODS" files 24 generated by the OmrGen Forms Definition Tool 22.

For each form (page), the GS-OMR processes each Reference Mark field and each OMR field as defined for that document type in the job's ODS file. The output of the Reference Mark field reads is used internally by the GS-OMR for each form for adjusting the OMR target coordinates in order to correct for the various image distortions introduced in the scanning process. This allows GS-OMR to more precisely locate each target. The output of each OMR read field is written out to the SOTIFF file. The information to be output for each OMR field includes the Field Name (as defined in OmrGen), the zone coordinates X, Y, width, and height (as defined in OmrGen and adjusted by the Reference Mark reads), and the Field Value. The Field Value is the ASCII representation of the OMR field result as interpreted according to the OMR field definition parameters. For example, suppose an OMR field has a target group 16, four targets 18 defined and labeled A, B, C, and D, respectively. GS-OMR will examine the respective target locations and return the one label, A, B, C, or D, which corresponds to the one target that is deemed to be marked. If no target is marked or multiple targets are marked, then the appropriate default symbols will be output for the field.

It should be appreciated that, at a basic level, the reference marks are used to properly "orient" the marked form onto the coordinate system of the virtual form, thereby inferring the nominal locations of all the targets in the marked form on the assumption that the relation of the targets to the reference marks of the marked form is known apriori.

Preferably, however, deviations or distortions associated with scanning of the marked forms are handled to adjust the nominal locations of the targets. The adjustments for correcting deviations of the marked forms relative to the printed master and digital virtual forms, can be based on a variety of relative offsets. For example, when the gray scale pixels of the reference marks of a given marked form are compared with the reference mark coordinates and criteria of the virtual form, the algorithm can adjust the virtual location of the targets in the virtual form, and then compare these with the gray scale pixels of the marked form file. Alternatively, the gray scale pixels of the marked form (or the derived center of each cluster thereof) can be virtually offset to implement the adjustment before comparison with the location of the virtual targets of the virtual form. These are equivalent techniques and recitation of either should be understood as including the other.

Similarly, whereas a target or target search zone is virtually drawn or otherwise defined for each target in the virtual form file (e.g., FIG. 8), the marked production forms will typically be scanned with drop out filters so no outline or image of a bubble or the like, will be represented in the marked form file. It should be understood, however, that one can nevertheless refer to a "target" in the marked form file, as an area within a coordinate space corresponding to the nominal location or adjusted nominal location of a target in the virtual form file. Thus, the "target" locations of each form in the marked form file, can be defined and adjusted relative to the nominal target location in the virtual form file.

It should be appreciated that one of ordinary skill in the relevant field could, based on the following detailed description, select commercially available hardware and produce computer code in a commercially available language, for making and using the invention without undue experimentation. Moreover, in the interest of avoiding duplication, the implementing details for the functionality of the scoring portion of the system are not set out separately from the implementing details for the forms definition program, because the former can readily be understood from the latter.

II. Detailed Description 1.0 Introduction

OmrGen 22 is a tool that provides the capability of defining all the information necessary for reading and interpreting the "bubble" targets on test booklets and similar forms. OmrGen provides a graphical user interface to allow the user to easily and accurately define the regions of interest on the forms to be processed. Using scanned images of booklet pages as templates, the user identifies the locations and interpretations of the bubble targets. Various reading and editing rules are also specified. The output of the OmrGen 22 is an "OmrGen DEScriptor" (.ODS) file 24 which contains all the information defined for a job. The features of Omr-Gen include:

Ability to process gray-scale as well as bi-tonal images.
Automatically locates reference mark within defined search area.
Extensive editing rules.
Flexibility in defining the locations and interpretations of targets.
Advanced "Mark find" features for accurately locating marks on distorted images.
Option for defining all targets at one fixed size, or allowing varying sizes.

2.0 Glossary of Terms

Bubble—Synonymous with "Target". Target.

Mark—The state or classification of a target whose Read Level is at or above the defined Minimum Read Level for a Mark.

Maximum Read Level for an Omit—an OMR field property which defines the maximum numeric value that a Read Level for a target may have in order for that target to be classified as an Omit.

Minimum Read Level for a Mark—an OMR field property which defines the minimum numeric value that a Read Level for a target must have in order for that target to be classified as a Mark.

Omit—The state or classification of a target whose Read Level is at or below the defined Maximum Read Level for an Omit.

OMR Field—(Optical Mark Read Field) the definition of a related set of targets that produce a single answer for its output. An OMR field definition contains the following elements: a name, a rectangular area specification of an area of the page, a collection of target definitions, and a set of properties that define how the target definitions are to be interpreted.

Page Definition—A Page Definition contains all the information necessary to read and process a single printed side (face) of a page of a booklet. A Page Definition consists of a collection of OMR Fields and REF Fields that are used for registering and reading the targets of a particular page type. A Page Definition also contains a set of properties, which include Document Name and Template Image.

Read Level—The "darkness" of a target as sensed by the optical reader. The Read Level is usually normalized into the range of 0 through F (this is hexadecimal notation for the numeric values 0 through 15) where 0 is the lightest possible sense reading and F is the darkest.

Rectangular area specification—a set of four real numbers that specify the locations of the top, bottom, left, and right sides of a rectangle in Cartesian coordinates. A Rectangular area specification is usually given in units of inches.

REF Field—(Reference Mark Field) the definition of an area of the page that contains a pre-printed reference mark. Reference marks are used to re-align an image to compensate for the various distortions in it introduced by the scanning process. A REF field definition contains two elements, a rectangular area specification that defines a search area, and the actual reference mark location.

Target (synonymous with "Bubble")—a pre-printed circular or elliptical shaped object on a form whose purpose is to be either filled in (marked) or left blank (omitted) by the examinee for the purpose of recording responses.

Target Definition—A rectangular area specification that defines the location and size of an area to be sensed for the Read Level of one single Target. Every Target Definition belongs to an OMR Field.

Target Group—A subset of the Target Definitions of an OMR Field that together produce a single character position of the output of the OMR Field. There is a one-to-one correspondence between Targets Groups and character positions of the OMR Field's output string. Every Target Definition of an OMR Field belongs to one and only one Target Group. Target Groups form a logical grouping of targets, typically into rows or columns, where each row or each column forms a group of targets which together produce a single character of an output string. For example, a "Last Name" OMR Field might have 312 targets arranged into 12 columns and 26 rows, where each row is labeled as A–Z. In this case, the 26 targets of each column would belong to a Target Group, and the OMR Field would produce a 12-characer string as its output, one character position for each of the 12 Target Groups of the OMR Field. For another example, a "single-question" OMR Field containing 5 targets, labeled A–E, would typically be defined to have one Target Group that contains all 5 of the targets, and produces a single-character output.

Uncertain—the state or classification of a target whose Read Level is above the defined Maximum Read Level for an Omit and below the defined Minimum Read Level for a Mark.

3.0 Overview

OmrGen at the highest level is used to define jobs. Each job defined by OmrGen is stored in its own file. A job is made up of a set of Job Properties and a collection of one or more Page Definitions. A Page Definition is made up of a set of Page Properties and a collection of one or more OMR Fields and some number of REF Fields. An OMR Field is made up of a set of OMR Field Properties and a collection of one or more Target Definitions.

4.0 Jobs

A job consists of the definitions of all the pages that will be processed together in a batch. This typically includes all the pages of a booklet, plus any school or class headers, etc. that may be scanned with the booklet. OmrGen allows the user to define one job at a time. The user may add, edit, or deleted the page definitions of a job.

4.1 OmrGen Job Screen

When OmrGen starts up, the Job screen is initially displayed containing an empty job, with the name "Untitled". The user may add pages to the job, save the job, or save it under a different name, or load in a previously defined job. FIG. 3 is a screen shot 40 showing an example of the OmrGen Job dialog after a job has been loaded.

This example shows a job containing eight pages. The caption bar 42 at the top of the dialog shows the complete path name of the ODS file that stores this OmrGen job definition. The ODS file for a particular job is synonymous with the job itself. An asterisk immediately to the right of the ODS file name indicates that changes have been made to the job which have not yet been saved. The caption bar also shows the number of pages defined in the job. An OmrGen Job consists of a collection of Page Definitions and a set of properties. The List box 44 on the Job dialog shows the list of all Page Definitions that are part of the job. A Page Definition corresponds to one side (or face) of a booklet page or header sheet to be processed. The rows of the List box display summary information of the Page Definitions of the job. The columns of the List box display the following information about each Page Definition:

Status Icon 46—displays a graphical icon indicating the disposition of the Page Definition. There are two possible values for this Icon, a page icon containing a blue "C" or a page icon containing a red "X". The blue "C" indicates that each REF and OMR zone on the Page Definition is complete and correct. A red "X" indicates that at least one REF or OMR zone defined on the page is either incorrect or incomplete. The terms "complete" and "correct" refer only to self-consistency from the point of view of OmrGen, they do not refer to any type of completeness or correctness of the application itself. For example, a REF or OMR zone without a name is incomplete, an OMR zone without sufficient target labels is incomplete, or a REF zone without a correctly-located reference mark is incorrect. OMR zones that are defined invalidly according to application criteria, such as not having the targets defined properly over all the bubbles, or not having the correct target labels, are not marked as invalid with the red "X" for such reasons. GsOmr will not process a job that has any red "X"s. However, jobs with red "X"s can be saved to their ODS file and reloaded later for completion. In FIG. 3, no "X" is shown.

"Document Name" 48—displays the Document Name associated with the page. The Document Name is a user-definable string that is used by the GsOmr run-time program to associate, or link, each image from the data batch being processed to the correct Page Definition. Specifically, each image from the data batch must have a data field called "#Document Name" assigned to it by the Series 9000 scanner. The value of this data field is a string that identifies the page, or face, of the booklet or header for that image. The string value of that data field is therefore used to select the correct Page Definition to be used by GsOmr for processing the image. OmrGen performs no validation on the Document Name string.

"REFs" 50—displays the count of Reference Mark Fields defined on the page.

"OMRs" 52—displays the count of OMR Fields defined on the page.

"Image File Template" 54—Displays the full path name of the TIFF image file that contains the "background" template image for that Page Definition.

"Page" 56—Displays the ordinal index number of the image within the TIFF image file that contains the "background" template image for that Page Definition. This number does not specifically relate to the page number within a booklet, it relates only to the image number within the template image file.

4.20 mrGen Job Screen "File" Menu Selections

Figure 4:
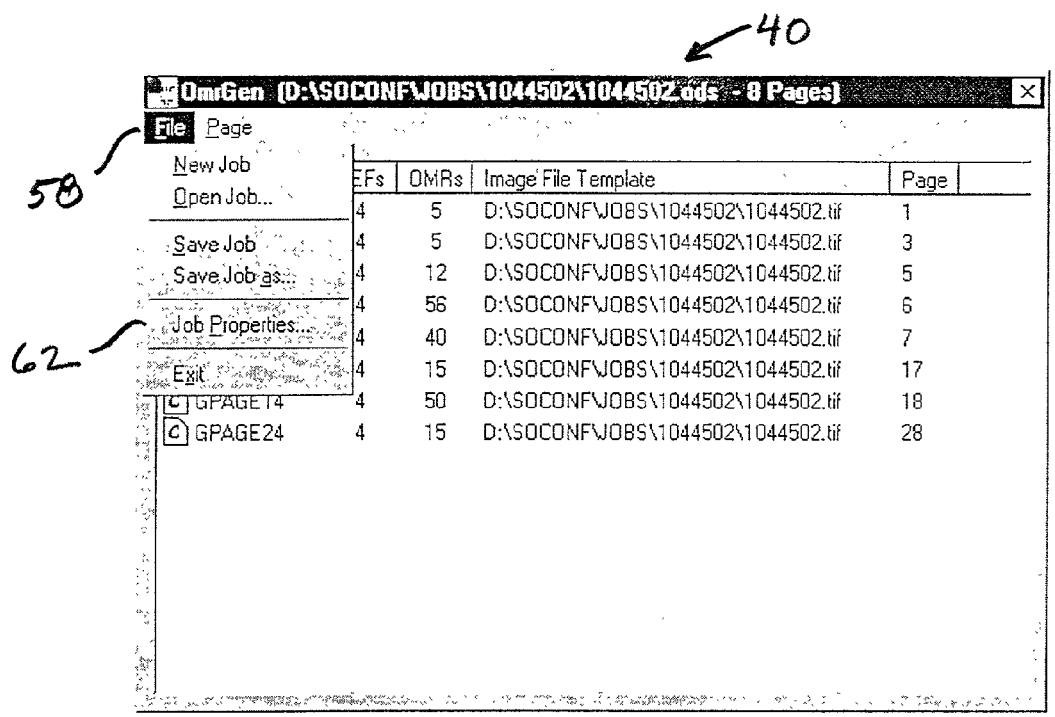
FIG. 4 is a screen shot showing the selections available on the OmrGen Job Screen "File" pull-down menu.

FIG. 4 is a screen shot showing the selections available on the OmrGen Job Screen "File" pull-down menu 58. The following options are available under the File pull-down menu:

"New Job"—This selection clears any loaded job from memory for the purpose of beginning a new job definition. Any and all pages in memory are cleared and the Job Properties are reset back to their default values. If there is presently a Job loaded in memory having changes that have not been saved, OmrGen will prompt the operator whether to save it before clearing it out.

"Open Job"—This selection allows the user to load an existing job into memory. Choosing this selection invokes the Windows "File Open" common dialog box that allows the user to navigate through subdirectories to select a file to open. If there is already a Job loaded in memory having changes that have not been saved, OmrGen will prompt the operator whether to save it before clearing it and loading the new job.

"Save Job"—This selection saves the currently loaded Job to its disk file. If the disk file already exists, it will be overwritten without prompting. If the current job has not yet been named by the user, that is, it still has the name "Untitled.ODS" as assigned to it by the "New Job" selection, then OmrGen will actually perform a "Save Job As" operation (see "Save Job As" below) rather than a "Save Job".

"Save Job As"—This selection is the same as the "Save Job" selection, except that it first invokes the Windows "File Save" common dialog box to allow the user to choose an alternate path or file name under which to save the job.

"Job Properties" 62—This selection invokes a dialog box which allows the user to examine and/or modify the properties of the currently loaded job. Please refer to the Job Properties section for details about this dialog box.

"Exit"—This selection terminates the OmrGen program. If there is presently a Job loaded in memory having changes that have not been saved, OmrGen will prompt the operator whether to save it before terminating.

4.3 Job Properties Dialog Box

Figure 5:
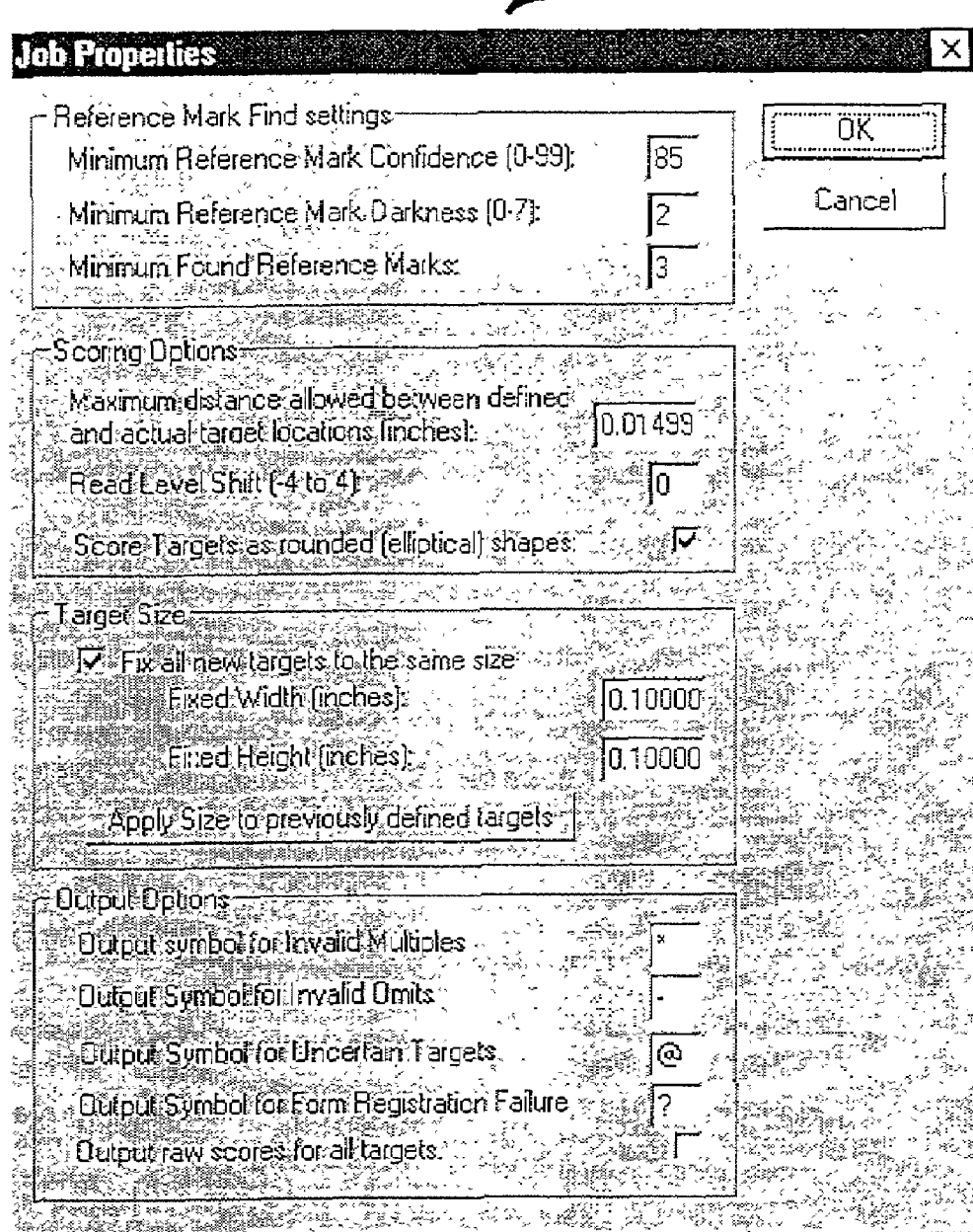
FIG. 5 is a screen shot showing the Job Properties dialog box, for allowing the user to view and edit job-wide settings and definitions.

FIG. 5 is a screen shot 64 showing the Job Properties dialog box which opens via 62 in FIG. 4. The purpose of this dialog box is to allow the user to view and edit job-wide settings and definitions. There are four categories of parameters in the Job Properties dialog box: Reference Mark Find Settings, Scoring Options, Target Size, and Output Options.

The Reference Mark Find settings category of this dialog box allow the user to modify the settings used in locating and using the reference marks 20A–20B (FIG. 1). Table 1 describes the settings in this category.

The Scoring Options settings category of this dialog box allow the user modify the parameters which control how the Read Level for each target is computed. Table 2 describes the settings in this category.

The Target Size settings category of this dialog box allow the user select whether all targets will be defined at one fixed size and, if so, what that one fixed size will be. The settings in this category are actually applied in OmrGen and affect the way OmrGen behaves, and therefore they have only an indirect effect on run-time processing. Table 3 describes the settings in this category.

The Output Options settings category of this dialog box allow the user modify the parameters which control how the results of each OMR Field and each page are output. Table 4 describes the settings in this category.

4.40 mrGen Job Screen "Page" Menu Selections

Figure 6:
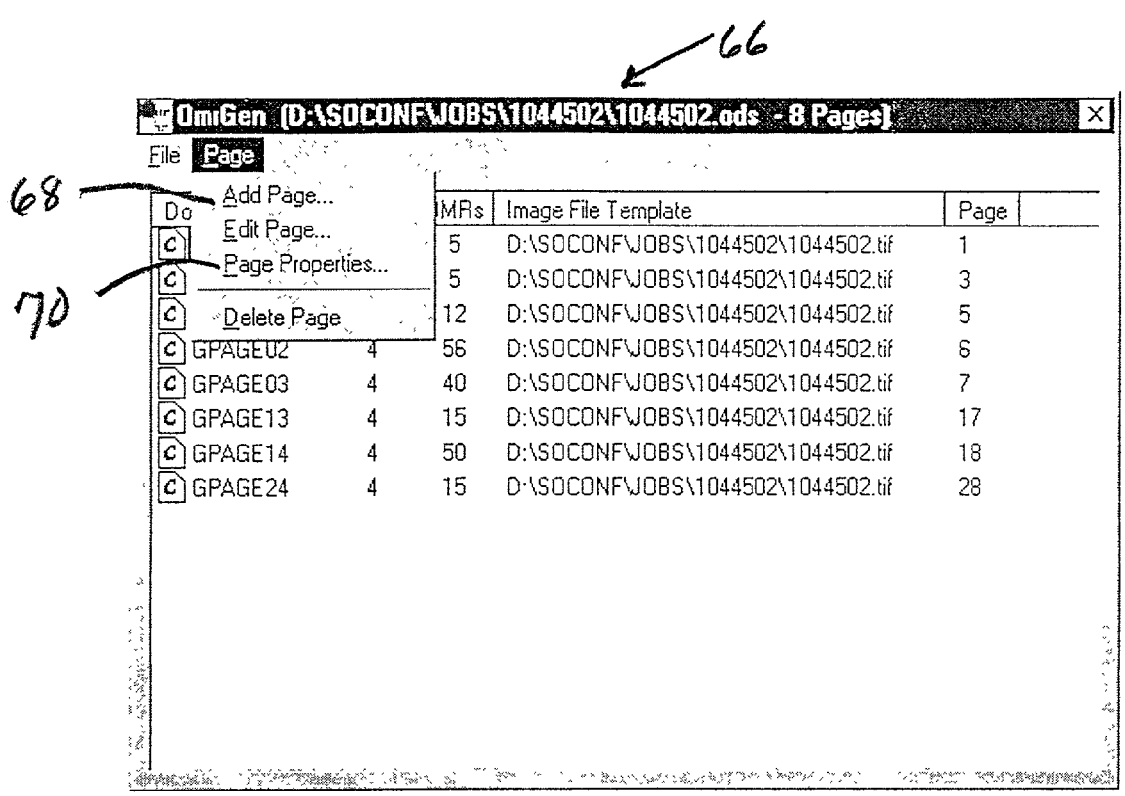
FIG. 6 is a screen shot showing the selections available on the OmrGen Job Screen "Page" pull-down menu.

FIG. 6 is a screen shot 66 showing the selections available on the OmrGen Job Screen "Page" pull-down menu which opens via 60 in FIG. 3. The following options are available under the "Page" pull-down menu:

"Add Page"—The purpose of this selection is to add a new Page Definition to the present job. This selection invokes the Page Properties dialog box. Under this dialog box, the user specifies the Document Name, the TIFF image file name and page number which contains the image template to be used for defining the Page. Once the user accepts the selection that he/she has made on the Page Properties dialog box, the new Page Definition is added to the job. This new Page Definition initially contains no REF or OMR field definitions.

"Edit Page"—The purpose of this selection is to invoke the OmrGen Edit Page dialog box. This dialog box is used to add, delete, or edit the OMR and REF field definitions for a selected Page Definition. One of the Page Definitions in the list must be selected (highlighted) prior to selecting this command. Alternatively, this command can be selected just by double-clicking the mouse on one of the Page Definitions in the List box. The "Edit Page" dialog box is described later in this document.

"Page Properties"—This selection, like the Add Page selection, invokes the Page Properties dialog box. One of the Page Definitions in the list must be selected (highlighted) prior to selecting this command. The properties of the selected page are brought up for viewing and editing. These properties include the page's Document Name, Template Image File name and page number.

"Delete Page"—This selection, as the name implies, deletes a Page Definition from the job. One of the Page Definitions in the list must be selected (highlighted) prior to selecting this command. Upon selection of this command, OmrGen displays a confirmation dialog box. If "Yes" is selected, the page and all its properties and OMR and REF field definitions are deleted from the job.

4.5 Page Properties Dialog Box

Figure 7:
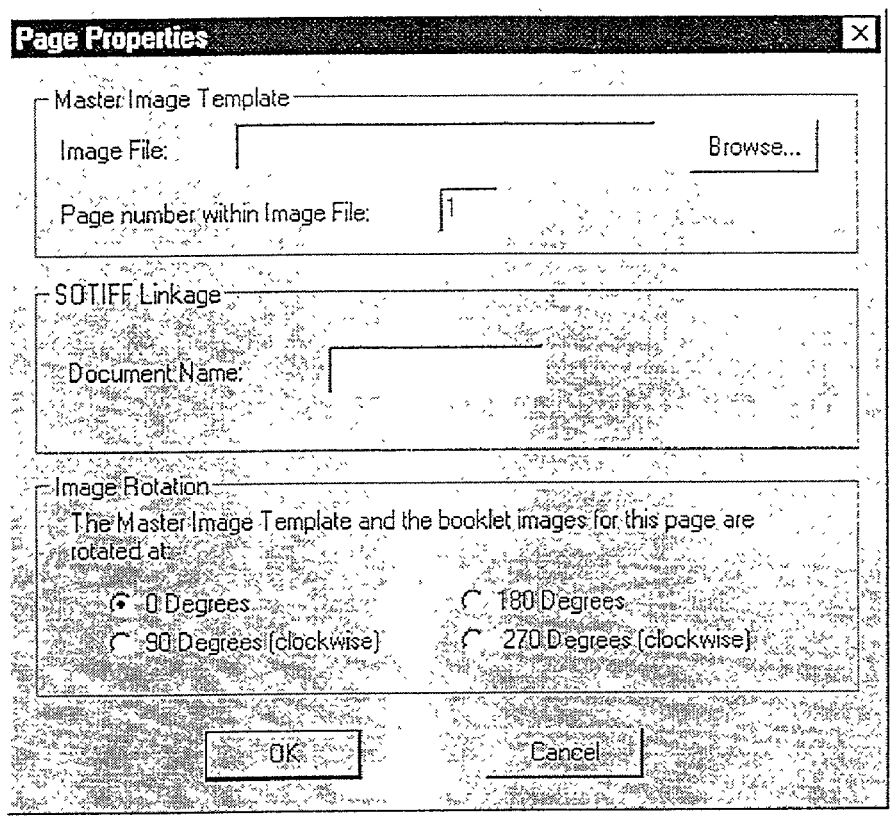
FIG. 7 is screen shot showing the Page Properties dialog box.

FIG. 7 is screen shot 72 showing the Page Properties dialog box. This Dialog Box is invoked by selection of either the "Add Page" 68 or "Page Properties" 70 menu selections shown in FIG. 6. The purpose of this dialog box is to allow the user to view and edit Page Properties. Table 5 describes the settings on the Dialog Box.

5.0 Pages

A Page Definition is composed of a group of REF Field Definitions and OMR Field definitions. Each REF Field and OMR Field is displayed graphically in the Edit Page Dialog Box. The Edit Page Dialog Box is used to create and edit the Field Definitions of each page. The Master Image Template defined in the Page Properties 72 for a given page is displayed in the background of the Edit Page Dialog Box. This image is used to assist both the user and the OmrGen program itself in achieving the most accurate definition of the locations of the objects on the form.

5.1 Edit Page Dialog Box

Figure 8:
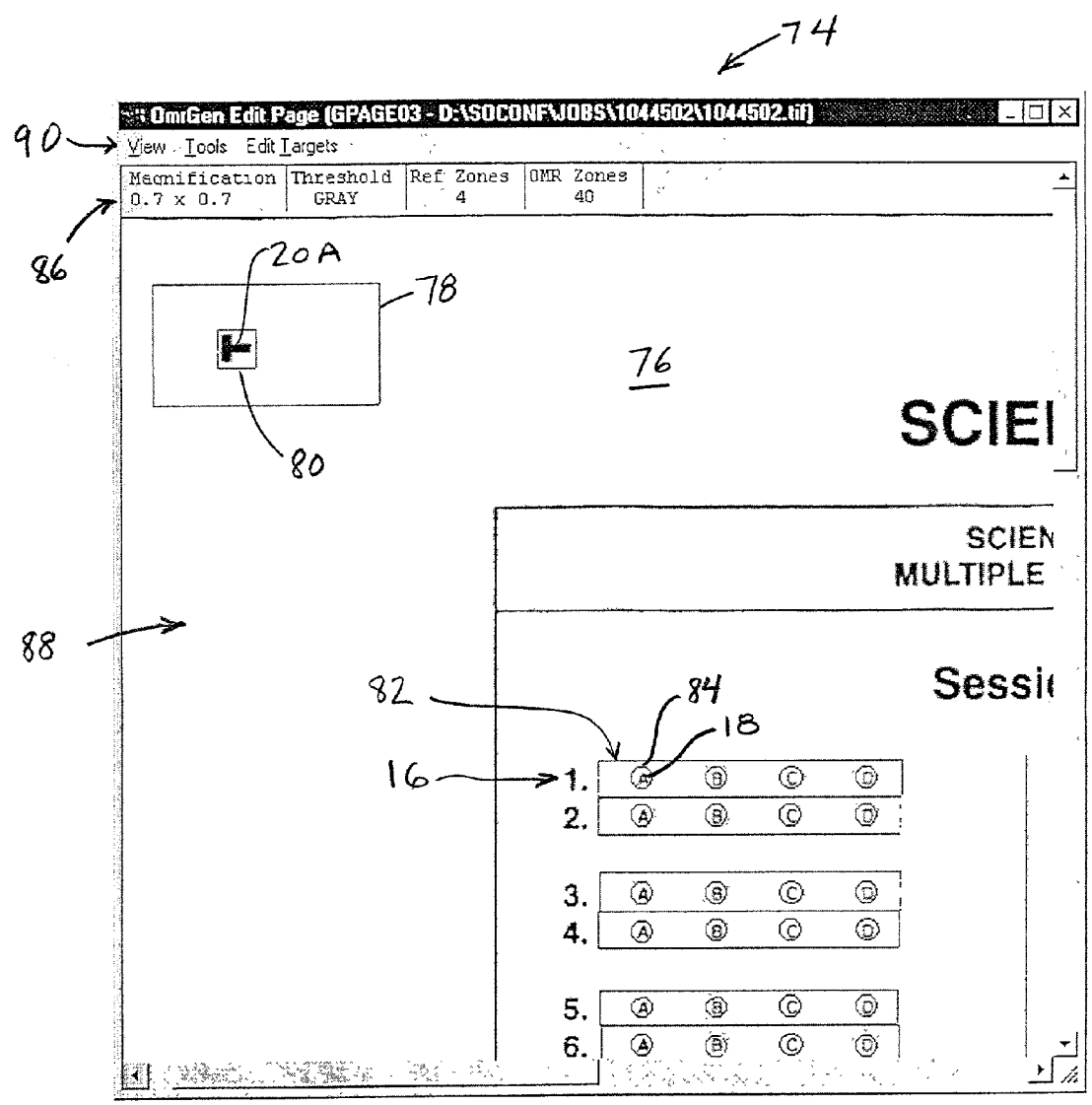
FIG. 8 is a screen shot showing an example of the Edit page dialog box containing a sample background image and some field definitions.

The Edit Page dialog box is the central point within OmrGen for defining all ORM Fields and REF Fields, and all their respective properties. FIG. 8 is a screen shot showing an example 74 of the Edit page dialog box containing a sample background image 76 and some field definitions.

5.2 Items of the Display

This dialog box employs a graphical user interface to allow the user to define, view, and edit the REF Fields and OMR Fields on the page. The following items are contained on this dialog box:

Background 76—The background area of this dialog is painted with the Template Image that is defined for this page. This is a digital form that constitutes a virtual layout of a preprinted form, on a virtual coordinate system. This background image facilitates the correct positioning and sizing of the REF Fields, OMR Fields, and Target Definitions.

Field Definitions—On top of this background image is painted various rectangles and circles that show the locations and sizes of the page's field definitions. There are three types of these field definitions: (1) The REF Fields 78 are displayed graphically as an outer, green rectangle 78 that shows the search area for each reference mark. Inside the green rectangle is a smaller red rectangle 80 which shows the location at which OmrGen found the reference mark graphic 20A on the background image, (2) The OMR Fields 82 are displayed graphically as teal-blue rectangles that show the OMR Field area. This is larger than and surrounds the target group 16. (3) The Target Definitions are displayed graphically as blue circles (or rectangles, depending upon the setting "Score targets as rounded (elliptical) shapes" in the Job properties) that show the locations and sizes of the areas of the forms to be sensed for Marks and Omits. These surround (i.e., are larger than) the target 18.

Status Area—At the top of the dialog box is a status area 86 that displays some information about the current page and the current view settings. The following items are displayed in the Status Area: (1) Magnification—This item shows the current magnification, or "ZOOM" level, of the image 88 displayed on the dialog box. The two numbers are the scale factors, in the X and Y directions respectively, that are currently in effect for the image and field definition displays. (2) Threshold—This item applies to gray-scale template image only. This item shows the threshold currently being used for displaying the background image. (3) Ref Zones—This item shows the number of REF Zones presently defined on the page. An asterisk character to the right of this number indicates that one or more of the REF Zones are not validly defined. (4) OMR Zones—This item shows the number of OMR Zones presently defined on the page. An asterisk character to the right of this number indicates that one or more of the OMR Zones are not validly defined. (5) Selected Zone—This item shows the Field Name of the currently selected field.

Menu Selections—The Edit Page dialog box 90 contains various pull-down menus that allow the user to alter the view of the page, and access tools and features that facilitate the addition, correction, and deletion of the REF Fields, OMR Fields, and targets.

5.3 Pull-Down Menus

The Edit Page dialog box 90 contains three top-level pull-down menus: View, Tools, and Edit Targets.

5.3.1 View Pull-Down menu

Figure 9A:
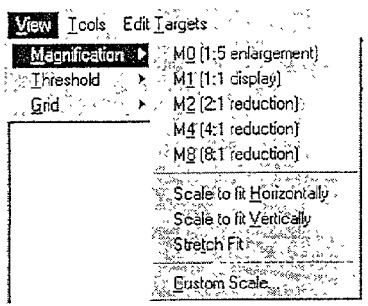
FIGS. 9A, 9B, and 9C are screen shots showing the three selections available under the View pull-down menu.
Figure 9B:
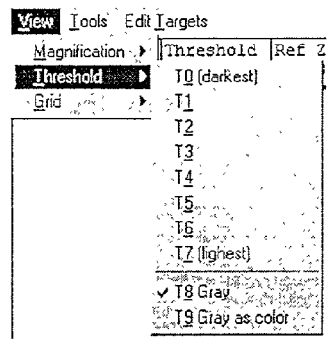
Figure 9C:
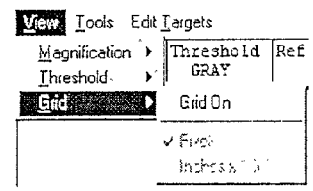

The selections under the View menu provide a way of altering the view, or rendering, of the display of the page and its definition. None of the selections under this menu alter in any way the actual job or page definition. FIGS. 9A, 9B, and 9C are screen shots showing the three selections available under the View pull-down menu: Magnification, Threshold, and Grid.

5.3.1.1 View->Magnification

The View->Magnification pull-down menu (FIG. A) provides selections for setting the "zoom" level of the display.

Figure 10:
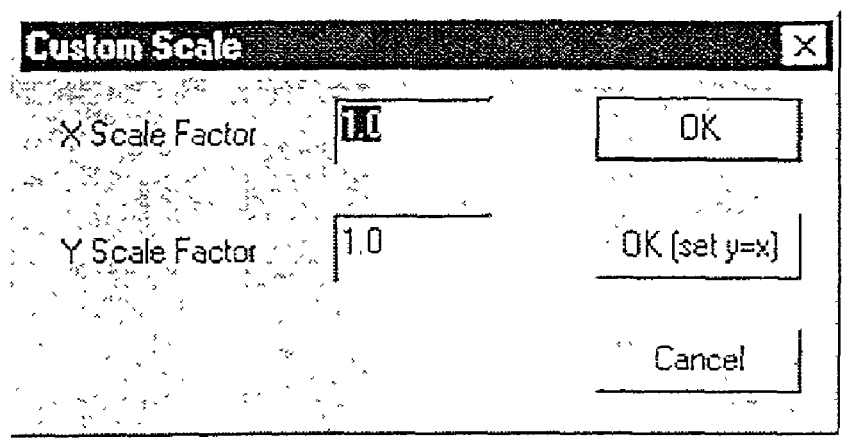
FIG. 10 is screen shot showing the Custom Scale dialog box.

The Magnification of the page display is specified as a "Scale" factor. The Magnification pull-down menu provides five "standard scale" settings (M0 thru M8) and various "custom scale" options (FIG. 10). The standard scale settings have been optimized for very a rapid display response, whereas the custom scale options, although more flexible, may provide a slightly slower display response. Table 6 describes the selections available under this menu:

5.3.1.2 View->Threshold

The View->Threshold pull-down menu (FIG. 9B) provides different options for rendering the pixels of gray-scale images. In black and white images (i.e.,. bitonal images) each pixel is either full black or full white. However with gray-scale image, each pixel has a numeric value in the range of 0 to 7 which indicates the darkness level of the pixel, where 0 is completely white and 7 is completely black, and 1 through 6 are somewhat evenly-spaced gray levels in-between. The options on the Threshold menu provide three methods of displaying the gray-level pixels: in bitonal (at a selected threshold level), in gray at eight evenly spaced display levels, or as a "gray as color" scheme where each of the eight gray levels is mapped to eight highly contrasted colors. Table 7 describes the selections available under this menu:

5.3.1.3 View->Grid

The View->Grid pull-down menu (FIG. 9C) provides turning the "grid" display on and off, and for selecting the units of the grid. The Units of the grid may be set to Pixels or Inches. The Grid is a tool to assist the user with measuring or locating the coordinates of items on a page. The "fineness" of the grid lines automatically adjusts to accommodate various zoom levels of the display.

5.3.2 Tools Pull-Down Menu

Figure 11A:
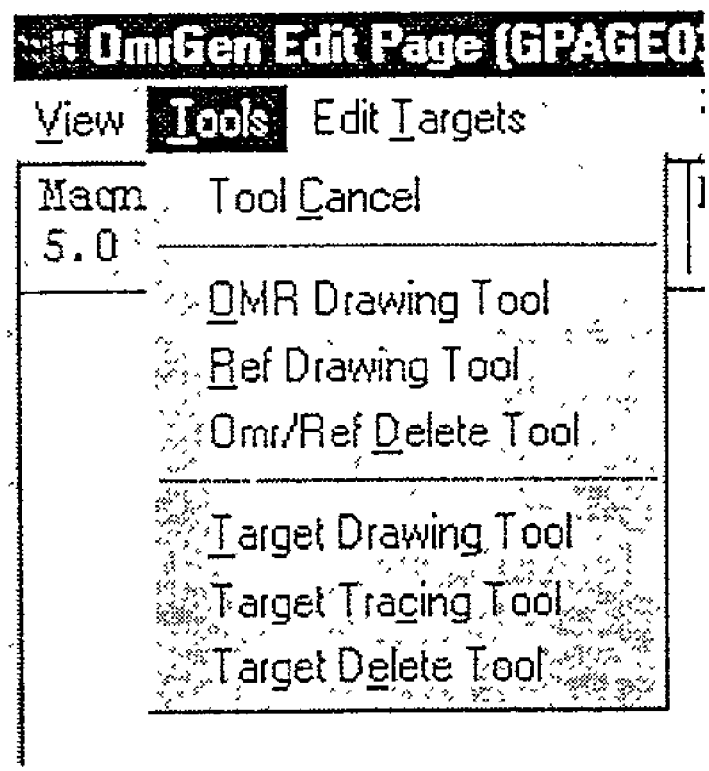
FIG. 11A is a screen shot showing the selections available under the Tools pull-down menu and FIGS. 11B–11H show how the mouse cursor changes to the respective drawing tool.
Figure 11B:

The Tools menu provides for the selection of the various drawing tools used for defining, modifying, and correcting each of the field types. FIG. 11A is a screen shot showing the selections available under the Tools pull-down menu and FIGS. 11B–11H shows how the mouse cursor changes to the respective drawing tool.

5.3.2.1 Tool Cancel

Selecting Tool Cancel causes any previously selected tool to be de-selected, or "dropped", and returns the mouse pointer to its standard "arrow" shape. When no tool is selected, the standard arrow-shaped mouse cursor can be used to select, move, or resize and of the fields defined on the page.

5.3.2.2 OMR Drawing Tool

When this option is selected (FIG. 11B) the mouse cursor changes into the OMR Drawing Tool. When the tool is selected, the program is "armed" for defining OMR Fields, such as 82 in FIG. 8. To draw an OMR field, select this tool, position the crosshairs of the cursor to the upper-left corner of the area of the image that contains the targets of a single OMR field to be read. Down-click the mouse button, drag the mouse to the bottom-right corner of the area, and release the button. While dragging the mouse, OmrGen will draw the selected area as a greenish-blue rectangle. Upon releasing the mouse button, OmrGen will automatically scan the defined area for all targets present upon the background image. For each object found that is within the correct range of possible sizes, a target will be added to the field. Each target added to the field will be displayed with a small blue circle such as 84 in FIG. 8 (ellipse, or rectangle, depending upon the Scoring Options defined in the Job Properties).

Sometimes OmrGen will not correctly locate all targets, and it may also identify extraneous marks as targets. The level of success depends greatly upon the quality of the background image. In the case of such errors, extraneous targets can easily be removed, missing targets can be added, and mispositioned targets can be adjusted, as follows:

Extraneous targets may be easily removed in either of two ways. (1) Select the field containing the target to be removed. Position the cursor over the target to be removed, the mouse cursor will change to the Target Reposition cursor. Drag and drop the target outside of the OMR Field. The target will be deleted from the field. (2) Select the Target Delete Tool, click on the extraneous target and it will be deleted. See the section below about the Target Delete tool.

Missing targets can be added by selecting the Target Draw tool. See the section below about the Target Draw tool.

Mispositioned targets can be moved by positioning the mouse cursor over them and dragging them to the desired location.

5.3.2.3 REF Drawing Tool

Figure 11C:
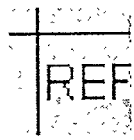
Figure 11D:
Figure 11E:

When this option is selected, the mouse cursor changes into the REF Drawing Tool (FIG. 11E). When this tool is selected, the program is "armed" for defining REF Fields (78 in FIG. 8). To draw a REF Field, select this tool, position the crosshairs of cursor to the upper-left corner of the REF Field search area, click and drag the mouse to the bottom-right corner of the area and release the mouse button. Upon releasing the mouse button, OmrGen will scan the defined search area for the reference mark. If it is successfully found, OmrGen will draw a green box around it. If not, an error message will be displayed and no green box will be displayed. In this case, the REF Field is considered to be invalidly defined.

5.3.2.4 OMR/REF Delete Tool

When this option is selected, the mouse cursor changes into the OMR/REF Delete Tool (FIG. 11D). The purpose of this tool is to allow the user to delete REF Fields and OMR Fields, by positioning this cursor over a REF or OMR Field and clicking to remove the field.

5.3.2.5 Target Drawing Tool

When this option is selected, the mouse cursor will change into either one of two possible target drawing tools, depending upon the setting of the "Fix all new targets to the same size" option in the Job Properties.

In the case where this option is set to OFF (Unchecked), the mouse cursor will have the appearance shown in FIG. 11E. In this first case, the user is provided with a tool that will allow drawing of variable-sized targets. Targets can be drawn within an OMR Field using the exact same "drag" method that is used to draw OMR or REF Fields on the page.

Figure 11F:
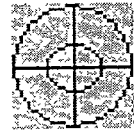

In the second case, when the "Fix all new targets to the same size" option is enabled (checked), the mouse cursor will have the appearance shown in FIG. 11F. In this case, the user is provided with a tool that will allow drawing of fixed-sized targets. To draw a target with this cursor, position the mouse to align the crosshairs and circles to be centered as exactly as possible over the center of the background image's target and click and release the mouse button. A new target will be created and its position will be centered exactly where the center of the mouse cursor was positioned.

5.3.2.6 Target Tracing Tool

Figure 11G:
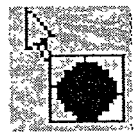

When this option is selected, the mouse cursor changes into the Target Tracing Tool, which has the appearance shown in FIG. 11G. With this tool selected, the user may point the mouse cursor at a single target object in the background image and click to draw a target field definition around it. The function works by tracing around the black background object pointed to the cursor. When the object trace is complete, the width and height dimensions of the traced object are validated to see if they are within the correct range of a target. If so, a new target definition is added to the current OMR Field, where the position (and size, if variable targets are allowed) of the new target is based on the location of the traced background object.

5.3.2.7 Target Delete Tool

Figure 11H:

When this option is selected, the mouse cursor changes into the Target Delete Tool, which has the appearance shown in FIG. 11H. The purpose of this tool is to facilitate quick and easy selective deletion of targets within a field. Just point the tip of the arrow of this mouse cursor into a target field and click the mouse, and the target will be deleted from the OMR Field.

5.3.3 Edit Targets Pull-Down Menu

Figure 12:
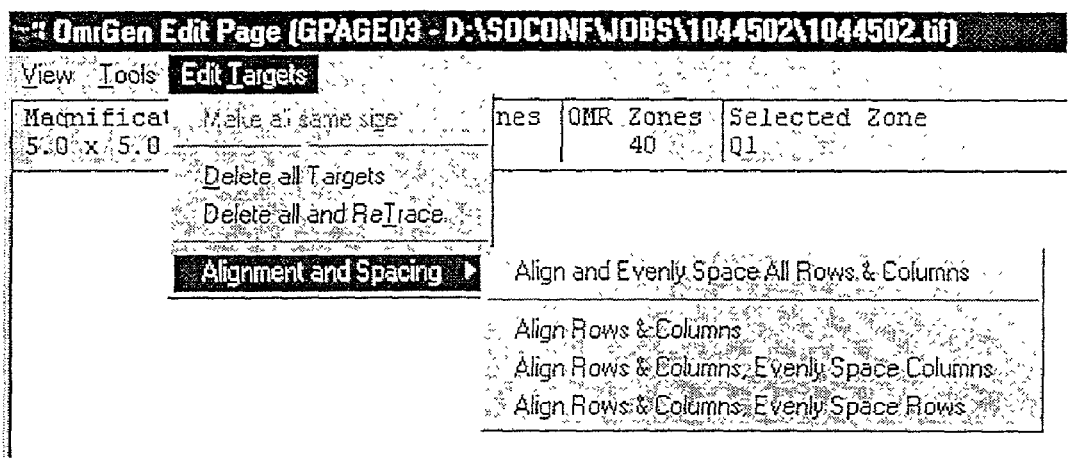
FIG. 12 is a screen shot showing selections available under the Edit Targets pull-down menu.

The Edit Targets menu provides for the execution of the various automated target processing functions. FIG. 12 is a screen shot showing the selections available under the Tools pull-down menu.

5.3.3.1 Make All Same Size

Selecting this menu command forces all targets in the currently selected OMR Field to become the same size. If there is a target selected within the OMR Field, then all targets will be resized to match the selected target. Otherwise, the targets will be resized to match the average size of all the targets in the OMR Field. Targets are resized in such a way that they are not moved, that is, their center positions remain fixed. If the "Fix all new targets to the same size" option is enabled (checked) in the Job Properties, then this menu command is disabled.

5.3.3.2 Delete All Targets

This command deletes all targets from the currently selected field.

5.3.3.3 Delete All and ReTrace

This command deletes all targets from the currently selected and re-invokes the "mark trace" function that is used to locate all targets on the background image. This is the same "mark trace" function that is invoked when the OMR Field is first drawn on the page.

5.3.3.4 Alignment and Spacing

The functions on the Alignment and Spacing sub-menu provide commands that perform automatic alignment of the rows and/or columns of targets in an OMR Field. These commands are typically used for OMR Fields that are composed of a straight, evenly-spaced row or column of targets, or a two-dimensional matrix of targets where the rows and columns are straight and evenly-spaced.

Align and Evenly Space All Rows & Columns

This command aligns all the rows and columns of targets in a field into straight lines, and repositions the rows and columns such that they are all evenly space between the top and bottom rows and the left and right columns. All realignment is based on the positions of the "corner" targets, that is, the four targets that form the corners of a two-dimensional matrix of targets, or the two targets that are the endpoints of the row or column.

Align Rows and Columns

This command aligns all the rows and columns of targets in a field into straight lines. This command is similar to the Align and Evenly Space All Rows & Column, but it does not alter the spacing between the rows and columns. This command is useful for OMR Fields that have straight rows and/or columns of targets but the rows and/or columns are not evenly spaced among each other. All realignment is based on the positions of the "corner" targets, that is, the four targets that form the corners of a two-dimensional matrix of targets, or the two targets that are the endpoints of the row or column.

Align Rows and Columns, Evenly Space Columns

This command aligns all the rows and columns of targets in a field into straight lines, and repositions the columns to make then even-spaced among each other. This command is similar to the Align and Evenly Space All Rows & Column, but it does not alter the spacing between the rows. This command is useful for OMR Fields that have straight rows and/or columns of targets but the rows are not evenly spaced among each other. All realignment is based on the positions of the "corner" targets, that is, the four targets that form the corners of a two-dimensional matrix of targets, or the two targets that are the endpoints of the row or column.

Align Rows and Columns, Evenly Space Rows

This command aligns all the rows and columns of targets in a field into straight lines, and repositions the rows to make then even-spaced among each other. This command is similar to the Align and Evenly Space All Rows & Column, but it does not alter the spacing between the columns. This command is useful for OMR Fields that have straight rows and/or columns of targets but the columns are not evenly spaced among each other. All realignment is based on the positions of the "corner" targets, that is, the four targets that form the corners of a two-dimensional matrix of targets, or the two targets that are the endpoints of the row or column.

6.0 REF Field Definitions

The REF Field Definitions define the precise locations of the reference marks on the page, as well as the "search area" for each reference mark. A "reference mark" is a pre-printed symbol on the page used to realign an image to compensate for image capture distortion. The search area for each REF Field is defined by the user, and OmrGen automatically computes the exact location of the reference mark within the defined search area. This is done to achieve the most precise definition possible of the reference mark location.

To create a REF Field definition, the user selects the REF Mark drawing tool (FIG. 11C). To draw a rectangle around each reference mark on the background image. The size of the rectangle defines the "search area", that is, the distance upward, downward, to the left and right, that GsOmr will search for the reference marks 20 at run time. This area should be large enough to account for the worst cases in image capture variation. This may typically be about 0.5 inch in all four directions. This area should not be drawn larger than needed since doing so will require additional processing time for each form, and may slightly increase the unlikely possibility that the program will find the wrong mark on the form.

Once the user has release the mouse button after drawing the REF Field search area, (or after resizing or moving the search area), OmrGen will automatically (re)compute the exact location of the reference mark within the search area. If OmrGen successfully locates the reference mark within the defined area, a red box 80 will be drawn around it. Otherwise, an error message will be displayed informing the user of the error, and the REF Field will be flagged as being in error.

7.0 OMR Field Definitions

A single OMR Field 82 corresponds to, and is used to define, a single question on the form. Each OMR Field produces a singular answer, which may be single character answer (e.g. in the case of a multiple-choice question), or a mult-character string (e.g. in the case of a last name field).

7.1 Steps for Defining an OMR Field.

Each OMR Field definition defines the area, properties, list of targets, and Read and Edit Rules of field.

7.1.1 Draw the Field

The first step in defining a new OMR Field is defining the field's area on the form, such as 82 in FIG. 8. This area is a rectangle that must include all of the targets that are part of the field. It may optionally be larger to include additional area, such as the text of the question, but if it does, that additional area is not used by OmrGen and Gs-Omr. To define the field's area, select the OMR Drawing tool from the Tools menu. Using the mouse, draw a rectangle around the area containing all the targets of the field. Upon releasing the mouse button, OmrGen will automatically search the field area for each mark that could possibly be a target and create a Target Definition for it. It is recommended that the initially drawn area of a field only encompass the targets, and not the questions, in order that the initial set of targets be computed more accurately. After drawing the initial area, the area can then be expanded to include more area, if desired, without affecting the targets.

7.1.2 Create all Target Definitions

After drawing the OMR Field area, the next step is to accurately define the locations of all the targets in the field. If OmrGen has correctly located all these, there is no more work to be done in this regard. However, if OmrGen has not correctly located all targets, or it has located targets where they do not exits, then it will be necessary to make corrections. Extraneous Target Definitions can easily be deleted either by dragging them out of the field, or by selecting the Target Delete Tool and clicking on them. Misaligned targets can be repositioned simply by dragging them to their correct locations. Missing targets can be added by selecting either the Target Drawing Tool or the Target Tracing Tool (as described with respect to the Tools Pull-down Menu and FIG. 11).

7.1.3 Specify the OMR Field's Properties

Figure 13:
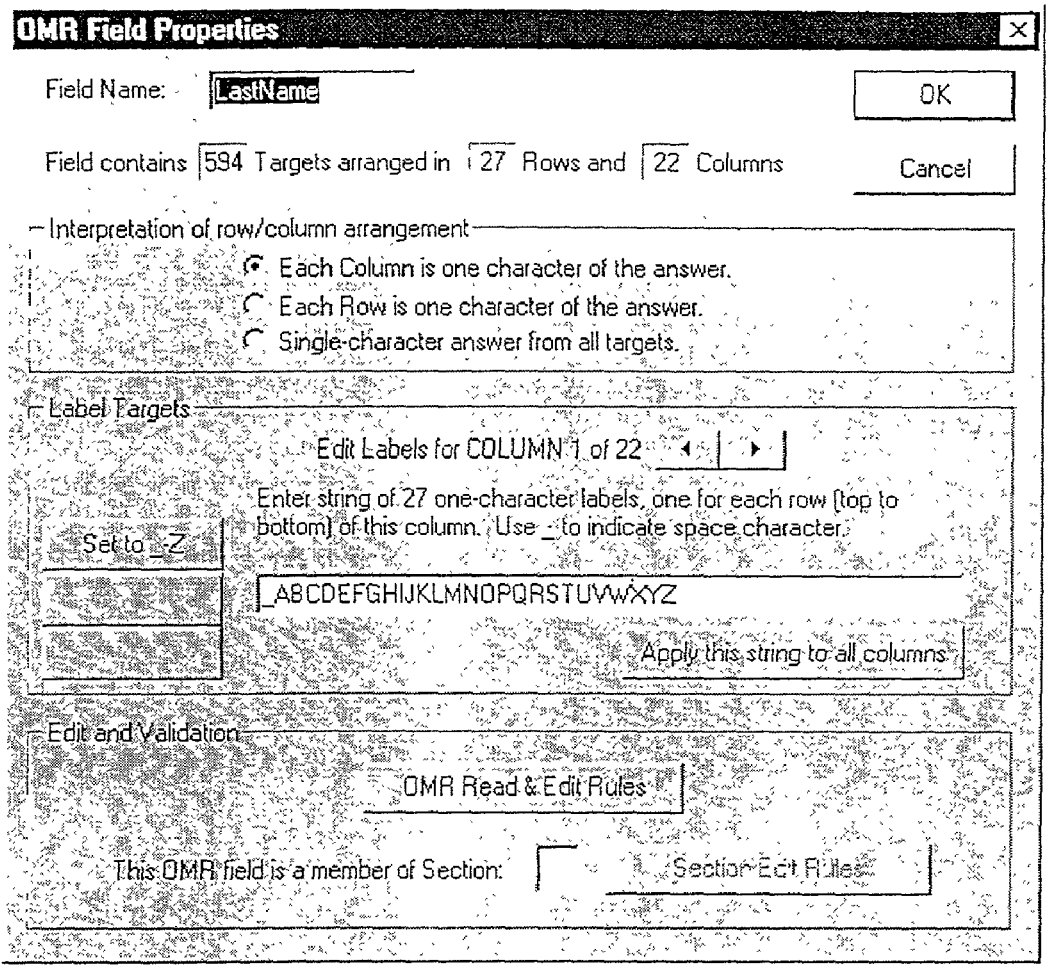
FIG. 13 is a screen shot showing the dialog box for selecting the OMR Field Properties for the "last Name" field.

Once all targets of the field are correctly and accurately defined with the Target Definitions over them, the next step is to define the field's properties. To open the OMR Field's Field Properties Dialog Box, right-click in the field. FIG. 13 is a screen shot showing the dialog box that will be displayed. Table 8 describes the properties that are displayed and/or specified using this dialog box.

7.1.4 Specify the OMR Read & Edit Rules

Figure 14:
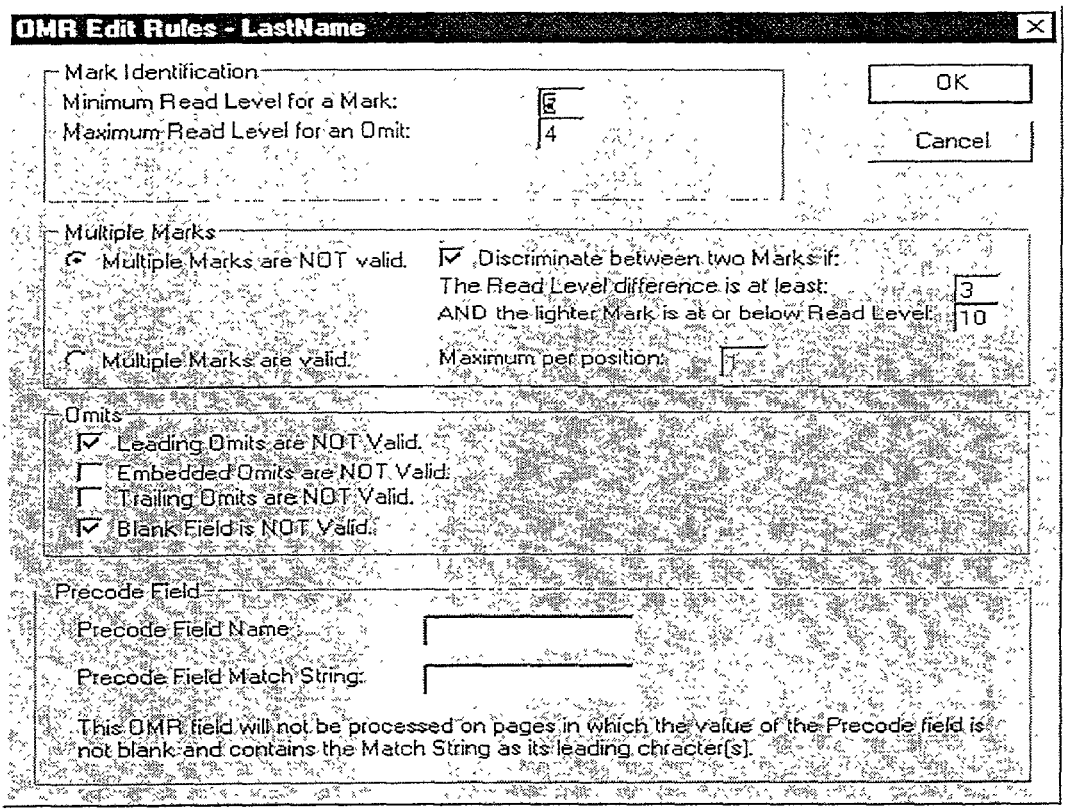
FIG. 14 is a screen shot for selecting the OMR Edit Rules for the "Last Name" field.

Selecting the "OMR Read & Edit Rules" command button from the OMR Field Properties dialog box opens up the OMR Read & Edit Rules dialog box, as shown in FIG. 14. This dialog box is used to define the reading and editing "business" rules of the OMR Field. Table 9 describes the properties that are displayed and/or specified using this dialog box.

7.1.5 Specify the Section Edit Rules

Figure 15:
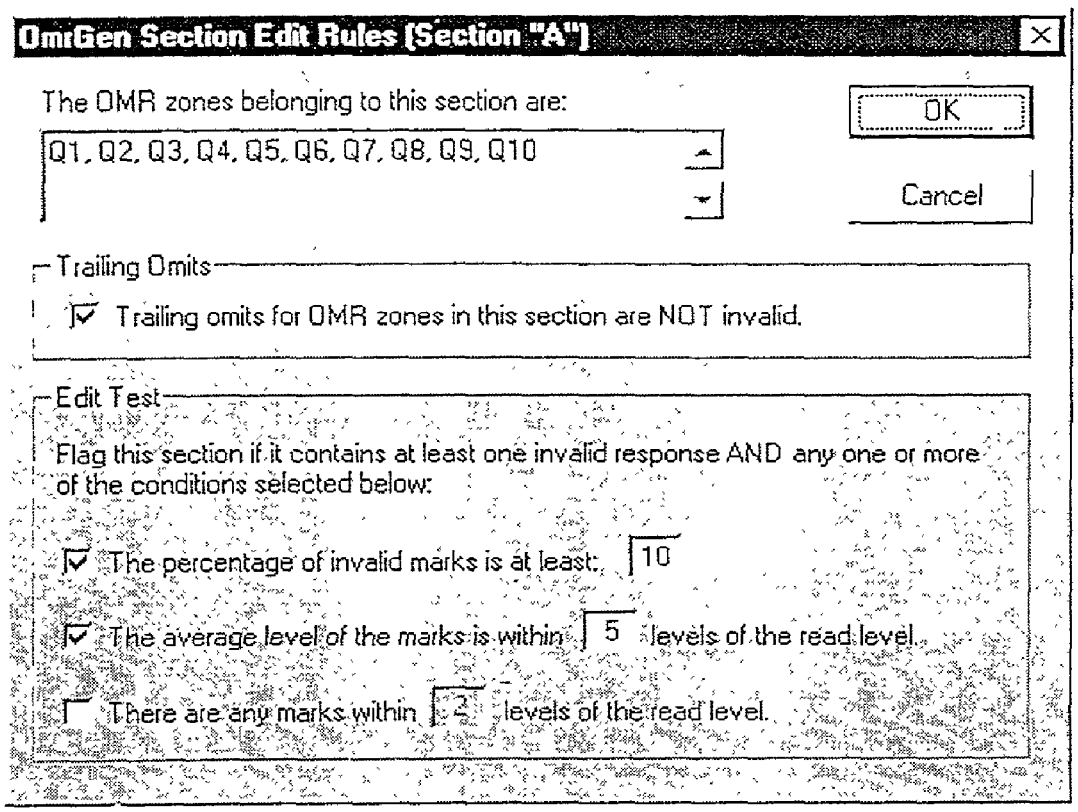
FIG. 15 is a screen shot of the dialog box used to define the section editing "business" rules of an OMR Field.

FIG. 15 is a screen shot of the dialog box used to define the section editing "business" rules of the OMR Field. Table 10 describes the properties that are displayed and/or specified using this dialog box. In order to specify the section rules for any given section, click the "Section Edit Rules" command button from the OMR Field Properties dialog box for any OMR field belonging to that section.

Section Edits are reading and editing "business" rules that are applied across multiple OMR Fields of a page. A "Section" is a logical group of OMR Fields of a page to which a specific set of editing rules are applied as a whole (such as 14 in FIG. 1). In order to define the Section Edit Rules, the user must first designate OMR Fields as belonging to a given "Section". In order place an OMR Field into a section, simply enter the one-character section ID into the Section name edit box at the bottom of the OMR Field Properties dialog box. All OMR Fields that are assigned the same Section name are by definition members of the same section.

TABLE 1

| | |
|---|---|
| Minimum Reference Mark Confidence | This setting is used to specify how closely each reference mark on the form must match the Reference Mark Mask in order for it to be considered as "found". The numeric value of this setting represents the minimum percentage of pixels that must match between the found mark and the Reference Mark Mask |
| Minimum Reference Mark Darkness | This setting is used to specify the lightest "darkness" level (in the range of 0 to 7) that the black portions of the reference mark capture at. This value is used in the first pass of the reference mark search algorithm to eliminate from the search all portions of the search area that are too light to possibly contain the reference mark. In other words, the portions of the reference mark search area where the image is lighter than this darkness level are not considered in the second pass of the reference mark search. |
| Minimum Found Reference Marks | This command is used to specify the minimum number of reference marks that must be found in order to continue processing the form. If fewer than this number are found on an image, then all OMR fields on that image will be flagged as invalid in order to signal operator correction. |

TABLE 2

| | |
|---|---|
| Maximum distance allowed between defined and actual target locations (inches) | This parameter specifies to what extent the Target Scoring module will shift (or jitter) each target mask, from its defined location, in search of the most darkness in the areas defined by each Target Definition. The Target Scoring module shifts (jitters) the location of the Target Definition in all 4 directions (left, right, up, down) canvassing the entire rectangular area in search of the darkest single target area. The criteria for selecting a value for this setting is the amount of expected variation between the defined location of each target and its actual location, that is, AFTER the image re-alignments have been made based on the reference marks. This variation is the cumulative effect (i.e. sum) of two main factors: 1. The tolerance (amount of variation) between the two passes of a two-pass print process, where the reference marks are printed in one pass and the targets are printed in the other, and 2. The level of non-linear distortion within the image introduced by the scanning process. |
| Read Level Shift (−4 to 4) | This setting is used to specify an adjustment factor to be applied (positive or negative) to all the Read Level definitions (i.e. Minimum Read Level for a Mark and the Maximum Read Level for an Omit) of all OMR Fields of the job. This adjustment factor is applied at GsOmr run-time, and does not actually alter the OMR Field definitions. This setting provides a convenient way of making a global |

TABLE 2-continued

| | |
|---|---|
| | adjustment to the defined Read Levels when tweaking jobs without having to manually alter the settings for every OMR Field of the job. |
| Score targets as rounded (elliptical) shapes | This setting is a check-box that is either turned ON or OFF. When this setting is OFF, the Target Scoring module computes the Read Level of each target based on all the pixels within the rectangular area defined by the Target Definition. When this setting is ON, the Read Level of each target is computed based on only the pixels that are within the elliptical area that is bounded by the rectangle defined by the Target Definition. Additionally, when this setting is ON, OmrGen (and the GsOmr diagnostic Display) will draw all Target Definition areas as ellipses, rather than rectangles. |

TABLE 3

| | |
|---|---|
| Fix all new targets to the same size | This setting is a check-box that is either turned ON or OFF. When this setting is On, OmrGen will force all Target definitions added to the job to be forced to one fixed size. Changing this setting from OFF to ON does not alter any Target Definitions already defined in the job. Additionally, when this setting is ON, the user is inhibited from changing the size of any Target Definitions. When this setting is OFF, targets may be defined at any size, and any existing targets may be resized without hinderance. |
| Fixed Width (inches) And Fixed Height (inches) | These two settings specify the fixed size, width and height, that will be applied to all Target Definitions added to the job. Note this setting is applicable only when the "Fix all new targets to the same size" setting is set to ON. Changing this setting does not alter any Target Definitions already defined in the job; its only effect is on newly added Target Definitions. |
| Apply size to previously defined targets | This option does not actually define a setting, rather it is a command button that, when clicked, executes a command to alter the Target Definition in the job. When clicked, this command changes the size of all Target Definition to the size specified by the Fixed Width and Fixed Height settings. As targets are resized they are not moved; their center-points remain the same. This command is available only when the "Fix all new targets to the same size" setting is set to ON. This command provides a convenient way to globally change all target sizes when tweaking a job. |

TABLE 4

| | |
|---|---|
| Output Symbol for Invalid Multiples | Specifies the symbol (ASCII character) to be output into the appropriate character position of the OMR Field's output string for any Target Group that contains more than one Mark and whereby the multiple marks that cannot be resolved via editing rules. This does not apply to OMR Fields for which multiple marks are valid. |
| Output Symbol for Invalid Omits | Specifies the symbol (ASCII character) to be output into the appropriate character positions of the OMR Field's output string for Target Groups that do not contain any Marks. This applies only to OMR Fields for which categories of Omits (e.g. leading, embedded, trailing, etc.) are defined as invalid. |
| Output Symbol for Uncertain Targets | Specifies the symbol (ASCII character) to be output into the appropriate character positions of the OMR Field's output string for any Target Groups that contain any Uncertain targets. |
| Output Symbol for Form Registration Failure | Specifies the symbol (ASCII character) to be output for all OMR Fields of a page in the case where the page failed to register. Registration Failure is the |

TABLE 4-continued

| | |
|---|---|
| | status of a page in which the minimum number of required Reference Marks were not located with the minimum required confidence value. |
| Output raw scores for all targets. | This setting is a check-box that is either turned ON or OFF to indicate whether or not the Raw Scores output file will be generated for batches of this job. The Raw Score Output file is an ASCII text file which is created for each batch processed by GsOmr. The name and path of this file is the same as that of the batch being processed but having the extension ".ORS" (Output Raw Scores). This output file contains the raw scores (i.e. Read Levels) of all Target Definitions of all OMR Fields of all pages of the batch. This file contains one "Comma Delimited ASCII" (CDA) text line for each OMR Field. The items on each CDA line are: DLN, SEQ#, DocName, FieldName, ScoreList. DLN is the serializer number. SEQ# is the ordinal sequential image number within the batch. DocName is the Document Name. FieldName is the name of the OMR Field. ScoreList is a string of Read Level scores (0–F) which correspond to the Read Levels of each of the Target Definition of the OMR Field. The sequence of the scores in the ScoreList is by each Target Definition's geographic location within the OMR Field as left to right and then top to bottom. |

TABLE 5

| | |
|---|---|
| Image File | This setting displays the full path name of the TIFF image file that contains the "background" template image for this Page Definition. The "Browse" command button may be selected to invoke the "File Open" Windows Common Dialog Box to facilitate selection of another file name. |
| Page number within Image File | This setting displays the ordinal index number of the image within the TIFF image file that contains the "background" template image for this Page Definition. The value of this number cannot be higher than the number of images in the Image File. |
| Document Name | This setting contains the Document Name associated with the page. The Document Name is a user-definable string that is used by the GsOmr run-time program to associate, or link, each image from the data batch being processed to the correct Page Definition. The value of this data field is a string that identifies the page, or face, of the booklet or header for that image. This field cannot be blank, a value is required. |
| Image Rotation | This setting is provided for pages in which the print on the page is not the in normal "upright" portrait orientation. This setting provides for images captured in portrait mode at 0 or 180 degrees rotation, or landscape mode at 90 or 270 degrees rotation. |

TABLE 6

| | |
|---|---|
| M0 (1:5 enlargement) | This selection displays the page at a 1 to 5 enlargement, that is, each one pixel of the background image is displayed as 25 (5x5) screen pixels. Note that at this magnification level (and larger), each pixel of the background image is rendered as a "separated" small box so that each pixel can be clearly differentiated. |
| M1 (1:1 display) | This selection displays the page with a 1 to 1 mapping of the pixels of the background image to the pixels of the display. |
| M2 (2:1 reduction) | This selection displays the page with a 2 to 1 reduction, where each 2x2 of pixels from the background image is scaled for display as 1 screen pixel. |

TABLE 6-continued

| | |
|---|---|
| M4 (4:1 reduction) | This selection displays the page with a 4 to 1 reduction, where each 4x4 of pixels from the background image is scaled for display as 1 screen pixel. |
| M8 (8:1 reduction) | This selection displays the page with a 8 to 1 reduction, where each 8x8 of pixels from the background image is scaled for display as 1 screen pixel. |
| Scale to fit Horizontally | This selection custom-scales the page such that the full horizontal width of the scaled page matches the current width of the dialog box's display area. |
| Scale to fit Vertically | This selection custom-scales the page such that the full vertical height of the scaled page matches the current height of the dialog box's display area. |
| Stretch Fit | This selection custom-scales the page independently in the horizontal and vertical directions such that the full horizontal width of the scaled page matches the current width of the dialog box's display area, and the full vertical height of the scaled page matches the current height of the dialog box's display area. Please note that this selection presents a distorted view of the image since the horizontal scale does not match the vertical scale. |
| Custom Scale | This selection invokes the "Custom Scale" dialog box, (FIG. 10), that allows the user to numerically specify the horizontal (X) and vertical (Y) scale factors. Any numeric value between the ranges of .01 to 200 may be entered as the X or Y scale factors. Selecting the "OK" command button accepts the two scale factors as displayed in the edit boxes. Selecting the "OK (set y = x)" command button accepts the value in the "X Scale Factor" edit box and applies it to both the X and Y scale factors. Using this button provides a short-cut method of entering a single scale factor (into the "X Scale Factor" edit box) to be used for both the "X" and "Y" directions. |

TABLE 7

| | |
|---|---|
| T0 thru T7 | Renders the gray-scale image as a bitonal image. The threshold setting (0–7) indicates which particular level of darkness within the 8-levels of gray that a pixel must have in order to be rendered as black. Specifically, for any of the 8 threshold settings "t" (where 0 <= t <= 7), if a pixel's darkness level is darker than (i.e. numerically greater than) the value of t, then that pixel will be rendered as black, otherwise it will be rendered as white. One corollary of this formula is that selecting a display threshold of T7 causes all pixels to be rendered as white since no pixel level in the range of 0–7 can ever be greater than the display threshold T7. |
| T8 Gray | Renders the gray-scale image in its normal gray-level display. Each pixel of the image is shaded to a gray darkness level that corresponds to its intensity. |
| T9 Gray as color | Renders the gray-scale image such that each of the eight possible gray levels of each pixel is mapped (displayed) to one of 8 colors, as follows:<br>Gray Level  Mapped Color<br>0  Black<br>1  Blue<br>2  Green<br>3  Blue-green<br>4  Red<br>5  Purple<br>6  Red-Green<br>7  White |

TABLE 8

| | |
|---|---|
| Field Name | Name which uniquely identifies the OMR Field within the current page. The name is a string of up to 20 characters, the string must not contain any embedded spaces. The field name is used to identify the results of the field read in the output file. |
| Field Contains . . . | This section of the dialog box is a read-only status area that shows the total number of Target Definitions in the field. In addition, it shows the result of OmrGen's calculation of the numbers of rows and columns of targets, based of the targets' geographical arrangement in the field. Specifically, OmrGen automatically analyses the locations of the targets in the field to logically place each target into a specific row and column. The row and column into which each target is logically assigned also becomes the mechanism used to identify and label each target. The user may view these numbers to ensure that he/she has drawn the correct number of targets and has done so with the proper arrangement. |
| Interpretation of row/column arrangement | This property defines how the targets of the field relate to each other, in terms of their row/column arrangement, for producing the result. For example, suppose a field has 35 targets, arranged in a matrix of 5 rows and 7 columns. There are three possible ways of interpreting and processing the results of the field.<br>The first possible interpretation is the case where each of the 7 columns produces one character of the answer. In this case, the result would be a 7-character string. Each of the 5 targets in each given column would be used to produce a single character of the answer.<br>The second possible interpretation is the case where each of the 5 rows produces one character of the answer. In this case, the result would be a 5-character string. Each of the 7 targets in each given row would be used to produce a single character of the answer<br>The last case is where the targets are not to be interpreted as having any particular row/column arrangement for producing output. In this case, a variable-length string, up to 35 characters, would be generated for the output. Each character of the output string would correspond to the label of each target in the field that was determined to be in the "Marked" state. |
| Label Targets | Every Target Definition of an OMR Field MUST have a Target Label assigned to it. All Target Labels are exactly one character long. The character may be any printable ASCII character. The "space" character may be used as a label, but it must be specified using the underscore character "_". Target Labels are defined by specifying one or more "label strings", where each character of the label string is assigned in succession to the Target Definitions of a given row or column. The method of assigning the characters of the label strings to the individual Target Definitions is dependent upon the selection of the interpretation of row/column arrangement property. In the case where this property is set to "each column is one character of the answer"; each label string corresponds to a column of the Target Definition matrix. Therefore, in this case, the user must define one label string for each column of Target Definition matrix, and the length of each string must equal the total number of rows in the Target Definition matrix. The characters of a given label string are associated with the Target Definitions according to eachTarget Definitions row number. That is, the first character of a label string is associated with the Target Definition in row 1, the second character of a label string is associated with the Target Definition in row 2, etc. In the case where a given row does not have a Target Definition defined, a "dummy" label character must be specified in that column's label string as a place holder to ensure that all subsequent label characters in the label string are associated with the correct Target Definitions. This also means that the number of characters in each label string must be equal to the total number of rows in the Target Definition matrix, not the number of Target Definition in any given row.<br>In the case where the interpretation of row/column arrangement property is set to "each row is one character of the answer"; the label strings are defined inversely from that described above. That is, each label string corresponds to one row of the Target Definition matrix, and the length of each string must match the total number of columns in the matrix.<br>In the case where the interpretation of row/column arrangement property is set to "single-character answer from all targets" there must be exactly one label string defined where the length of the string matches the total number of targets in the field. Each character of the label string is matched in succession with the Target Definitions in the matrix going from left to right and then top to bottom. |

TABLE 8-continued

| | |
|---|---|
| Label Targets command buttons | There are various command buttons within the Label Targets section of this Field Property dialog box. These commands facilitate the definitions of the label strings.<br>The "spin" control (left and right arrows) are used to advance forward and backwards to each of the separate label strings for the field.<br>There are three "helper" buttons to the left of the label string Edit Box. These command buttons provide up to three possible shortcuts for defining the label strings. Their only purpose is to save the user a little typing. If the length required for a label string corresponds to the size of a common character set (eg. ten corresponds to the number of digits, 27 corresponds to the number of letters plus space), then these buttons can be used to automatically enter the characters of that character set.<br>There is one more command button position under and to the right side of the label string Edit Box. This command button is labeled "Apply this string to all columns(rows)". This is also a helper function designed to save the user some typing and time. Pressing the command button takes and applies the string currently displayed in the Edit Box and assigns it to all the label strings for the field. |
| Edit and Validation | This section of the Field Properties contains two items:<br>1. A command button that opens the "OMR Edit Rules" dialog box for the current field. This dialog box is described in the next section.<br>2. A one-character edit box used to assign this OMR Field to Section, and a command button that opens the Section Edit Rules dialog box for the defined Section. This is described in the Section Edit Rules section of this document. |

TABLE 9

| | |
|---|---|
| Mark Identification | The parameters of this section define what is considered to be a Mark, an Omit, or an Uncertain, based on each sensed target's Read Level. The Read Level is the target's sensed "darkness" level measured on a scale of 0 to 15, where 0 is fully light (unmarked) and 15 is fully dark (marked completely).<br>If the Read Level of a given target is at or above the "Minimum Read Level for a Mark" that target is classified as being a Mark.<br>If the Read Level of a given target is at or below the "Maximum Read Level for an Omit" that target is classified as being an Omit.<br>If the Read Level of a given target is below the "Minimum Read Level for a Mark" and above the "Maximum Read Level for an Omit", then that target is classified as being Uncertain. |
| Multiple Marks | The parameters of this section define the business rules of how to process multiple Marks within the current OMR Field. The primary selection within this section is the specification of whether or not multiple marks are valid or not for the current field.<br>In the case where multiple marks are not valid, an option for automatic discrimination between two marks is provided. (Note there is no option for automatic discrimination among more than two Marks.) This option is enabled by checking the appropriate checkbox. When this option is enabled, two additional parameters must be specified for use in the discrimination process. The first of these two parameters specifies the minimum numerical difference that must exist between the Read Levels of the two Marks. The second parameter specified maximum Read Level that the lighter of the two marks may have in order for the two marks to be discriminated. If both of these two conditions are met, the two mark will be discriminated by ignoring the lighter of the two marks and treating the darker as the only mark.<br>In the case where multiple marks are not valid, and the field does contain multiple marks which cannot be discriminated, the output value of the field will be set to the symbol defined on the Job properties for "Invalid Multiples".<br>In the case where multiple marks are defined as valid, the user may specify a limit as to the maximum number of marks that are allowed in the field. If this limit is specified and exceeded, then the output value of the field will be set to the symbol defined on the Job properties for "Invalid Multiples".<br>When multiple marks are allowed (and the maximum is not exceeded) the output value for the field is constructed as a string containing the labels of all marked targets in the field. |
| Omits | The Omits section defines the business rules of when and where Omits are valid within the current field. There are four mutually independent checkboxes used for specifying the validity of omits:<br>Leading Omits are NOT Valid - When checked, the field is considered invalid when the first character position of the field is an omit (i.e. has no marks in it).<br>Embedded Omits are NOT Valid - When checked, the field is considered invalid when there are omits embedded within the field.<br>Trailing Omits are NOT Valid - When checked, the field is considered invalid when the last character position of the field is an omit (i.e. has no marks in it).<br>Blank Field is NOT Valid - When checked, the field is considered invalid when all character positions of the field are omits. |
| Precode Field | The Precode property of an OMR Field provides a method for overriding (i.e. suppressing) the OMR processing of that field in the special circumstance where the information for that field has been made available by some other preceding process. Specifically, the information for some OMR Fields may be pre-encoded in a barcode label applied to the form, and that barcode may have been successfully read by a preceding process. In this case, it is neither necessary nor desirable to attempt to perform the OMR process on the current field. The Precode Field property provides a means for facilitating this process.<br>If an OMR field's value may be precoded and stored into some other field, the Gs-Omr run time program can interrogate that other field to see if a particular "Match String" exists in that other field. If it does, Gs-Omr can bypass the processing of the current field.<br>To define such a precode field, enter the name of the precode field into the "Precode Field Name" edit box, and enter the value of the "Match String" into the "Precode Field Match String" edit box.<br>Note that when Gs-Omr interrogates the precode field for a successful precode, it compares only the first n characters of the value of the precode field with the defined Match String, where n is the length of the Match String. In other words, the Match String is actually just a status code prefixed onto the value of the precode field that indicates whether a successful read was achieved on the barcode label. |

TABLE 10

| | |
|---|---|
| OMR zones belonging to section Trailing Omits of OMR zones in this section are NOT invalid. | This property shows a list of the OMR Fields on the page that are members of the Section whose properties are displayed for editing.<br>When this edit rule is enabled, the characters within the "trailing" OMR Fields within this section that contain "Invalid Omit" characters are converted from "Invalid Omit" characters into Section Check characters. The term "trailing" OMR Fields here refers to the list of OMR Fields, logically sorted in alphabetical order by their names, starting from the end of the list and scanning backwards, until the first OMR Field is encountered that does not contain an "Invalid Omit" character.<br>This option is useful for specific types of examination pages where the exam is timed and there is therefore likelihood that there will be some number of unanswered questions toward the end of the page. |
| Edit Test | This Section Edit will provide for the flagging of all the OMR Fields in the section in the case where there is at least one invalid response (Invalid Multiple, Invalid Omit, etc.) AND any one of the other three optional conditions is true:<br>1. The percentage of invalid responses to above the defined maximum. |

TABLE 10-continued

2. The average darkness level of the marks in the Section is within some minimum number of levels from the defined read level.
3. There are any marks within some minimum number of levels from the defined read level.

What is claimed is:

1. A method of scoring a printed form having a plurality of preprinted reference marks at known locations and spatial relationships and a preprinted group of bubble targets, each target having a known size and shape at known nominal locations, the bubble targets representing possible responses to a question associated with the form, each target of the target group to be marked or left blank by the subject for the purpose of recording said response, comprising:

producing a digital virtual form file from the preprinted form, which virtual form defines a virtual layout of the printed form on a virtual coordinate system;

scanning the marked form to produce a marked form file of gray scale darkness values;

comparing the marked form file and the virtual form file to determine the locations and spatial relationships of the reference marks in the marked form file according to the virtual coordinate system;

based on the locations and spatial relationships of the reference marks according to the virtual coordinate system, establishing the nominal virtual coordinate location of each target in the marked form file;

sampling the gray scale darkness values at each nominal target location and producing an interpreted mark darkness value for each target of the marked form file;

interpreting whether the darkness value of the interpreted mark is to be deemed an intentional response; and producing as an output, a scored form file containing a scored value for each target group or target on the marked form page.

2. A method of scoring a printed form having a plurality of preprinted reference marks of known size and shape at known nominal locations and a preprinted group of bubble targets, each target having a known size and shape at known nominal locations, the bubble targets representing possible responses to a question associated with the form, each target of the target group to be marked or left blank by the subject for the purpose of recording said response, comprising:

producing a digital virtual form file from the preprinted form, which digital form defines a virtual layout of the printed form by sets of coordinates on a virtual form coordinate system;

digitally scanning the marked form to produce a marked form file of gray scale darkness values;

assigning each pixel of the marked form file, to a coordinate of the virtual form coordinate system;

processing the marked form file to determine the locations and spatial relationships of the reference marks according to virtual form coordinate system;

comparing the locations and spatial relationships of the reference marks of the marked form file to the locations and spatial relationships of the reference marks in the virtual form file, and adjusting the nominal location of each target in the virtual form file according to this comparison;

applying search criteria for sampling the darkness values of the pixels in a search zone at each adjusted nominal location and producing an interpreted mark darkness value for each target;

applying read criteria for interpreting whether the darkness value of the interpreted mark is to be deemed an intentional response;

applying logic criteria for permitted relationships between plural targets in a given target group; and producing as an output, a scored form file containing a scored value for each target group or target on the marked form page of said subject.

3. A method of scoring a printed form having a plurality of preprinted reference marks of known size and shape at known nominal locations and a preprinted group of bubble targets, each target having a known size and shape at known nominal locations, the bubble targets representing possible responses to a question associated with the form, each target of the target group to be marked or left blank by the subject for the purpose of recording said response, comprising:

producing a digital virtual form file from the preprinted form, which digital form defines a virtual layout of the printed form by sets of coordinates on a virtual form coordinate system, including a reference search zone defined around the nominal location of each reference mark and a target search zone defined around the nominal location of each target, wherein the units of the virtual form coordinate system have been established such that the size of each target spans multiple units;

digitally scanning the marked form at least in regions corresponding to the search zones of the virtual form to produce a marked form file of gray scale darkness values at each pixel coordinate of a pixel coordinate system that is mappable on the virtual form coordinate system;

processing each reference search zone of the marked form file to determine the locations and spatial relationships of the reference marks according to the marked form file, comparing these to the locations and spatial relationships of the reference marks in the virtual form file, and adjusting the nominal location of each target in the virtual form file according to this comparison;

applying search criteria for sampling the darkness values of the pixels at each adjusted nominal location and associated search zone and producing an interpreted mark darkness value for each virtual target;

applying read criteria for interpreting whether the darkness value of the interpreted mark is to be deemed an intentional response;

applying logic criteria for permitted relationships between plural targets in a given target group; and producing as an output, a scored form file containing a scored value for each target group or target on the marked form page of said subject.

4. A method of scoring a printed form page having a plurality of preprinted reference marks of known size and shape at known nominal locations and a preprinted group of bubble targets each target having a known size and shape at known nominal locations, the bubble targets representing possible responses to a question associated with the form, each target of the target group to be marked or left blank by the subject for the purpose of recording said response, and the marked form to be digitally scanned to produce a marked form file of gray scale darkness values at each pixel coordinate of a pixel coordinate system in which the units of the coordinate system have been established such that the size of each target spans multiple pixels, comprising:

storing a page descriptor file in which a virtual layout of the printed form page is defined based on the pixel coordinate system of the scanner, in which a reference search zone is defined around the nominal location of each reference mark and a target search zone is defined around the nominal location of each target;

storing a search parameter file in which criteria are established for sampling the darkness values of the pixels at each nominal location and associated search zone and producing an interpreted mark darkness value for each virtual target;

storing a read parameter file in which criteria are established for interpreting whether the darkness value of the interpreted mark is to be deemed an intentional response;

storing a logic parameter file in which criteria are established for permitted relationships between plural targets in a given target group;

processing each reference search zone of the marked form to determine the locations and spatial relationships of the reference marks according to the marked form file, comparing these to the virtual locations and spatial relationships of the reference marks, and adjusting the nominal location of each target in the virtual form file according to this comparison; and processing each target zone using the page descriptor file, search parameter file, read parameter file, and logic parameter file, to produce as an output, a scored form file containing a scored value for each target group or target on the marked form page of said subject.

5. A method for scoring a form page having a preprinted reference mark and a preprinted target group representing possible responses to a question associated with the form, each target of the target group to be marked or left blank by the subject for the purpose of recording said response, wherein the method comprises:

(a). scanning an unmarked master form page to produce a gray scale master image template file;

(b). inputting the master image file template to a form definition program, in which the user specifies functions to be applied to the gray scale images, including (1) define settings for locating and interpreting reference marks, including confidence level, minimum darkness, and minimum number of found reference marks (2) define scoring options for the targets, including the target size and shape, the maximum distance allowed between defined and actual target locations, (3) define output symbols for at least one of invalid multiples, invalid omits, uncertain targets, and form registration failure (4) with a graphic user interface draw zones of interest surrounding each reference mark and each target group on the master image template (5) for each zone of interest establish criteria by which the gray scale values are searched to determine the locations, shapes, and darkness values of candidate reference marks and candidate targets (6) define rules for interpreting whether the darkness value of a candidate mark should be deemed an intentional response (7) define rules for permitted relationships of multiple targets within a target group (8) store the form definition output as a virtual form file operatively containing criteria (1) through (7)

(c) passing the marked form through a scanner to produce a gray scale tiff subject file;

(d) scoring the marked form with a scoring program which accesses the virtual form file and the gray scale subject file including the steps of (1) comparing the locations and spatial relationships of the reference marks according to the marked form file to the locations and spatial relationships of the reference marks in the virtual form file, and adjusting the nominal location of each target in the virtual form file according to this comparison, (2) applying search criteria for sampling the darkness values of the pixels at each adjusted nominal location and associated search zone and producing an interpreted mark darkness value for each virtual target;

(3) applying read criteria for interpreting whether the darkness value of the interpreted mark is to be deemed an intentional response;

(4) applying logic criteria for permitted relationships between plural targets in a given target group; and (5) producing as an output, a scored form file containing a scored value for each target group or target on the marked form page of said subject.

6. A method for a scoring agency to use a scoring program to score a plurality of multi-page bubble response booklets having identical unmarked form pages, with each booklet to be marked by a different individual subject, the plurality of booklets being associated with a common job, wherein each form page has a plurality of non-dropout ink preprinted reference marks and a plurality of preprinted drop-out ink bubble target groups representing possible responses to questions associated with the form, each target of the target group to be marked or left blank by the subject for the purpose of recording said response, wherein the method comprises:

(a) scanning each unmarked form page with a non-dropout filter to produce a gray scale master image file template of the booklet;

(b) inputting the master image file template to a form definition program by which the scoring agency specifies the criteria by which the scoring program will recognize scanned gray scale images of the marked pages booklets as one of a reference mark, an intended response, or neither;

(c) with the form definition program, establish job properties that are common to all forms in the job, including (1) reference mark find settings, including confidence level, minimum darkness, and minimum number of found reference marks, (2) scoring options, including maximum distance allowed between defined and actual target locations, and target shape, (3) target size, including width and height, (4) output symbols for at least one of invalid multiples, invalid omits, uncertain targets, and form registration failure;

(d) with the forms definition program, establish a page definition for each page, including page properties, reference field properties, and OMR field properties, (1) wherein the page properties include the image template file name and page number, and sotiff linkage by document name, (2) wherein the reference field properties include location and size of region in which each reference mark will be searched, (3) wherein the OMR field properties include the location and size of each region in which a target group will be searched, the target definitions, the field properties, and criteria for evaluating distorted images;

(e) output the forms definition file as a virtual form file;

(f) after the subjects mark the form pages, pass the marked forms through a scanner with dropout filter to produce a gray scale job file;

(g) score the marked forms of the job file with said run time scoring program which accesses the virtual forms file and the job file and process the production images according to the forms definitions in the virtual form file.

7. The method of claim 6, wherein the OMR fields and reference fields are displayed in the form definition program with a graphical user interface whereby the scoring agency can define regions of interest on the forms to be processed including defining an OMR field by drawing the field.

8. The method of claim 7, wherein for each OMR field the agency uses the form defination program to create target definitions, specify field properties, specify OMR read and edit rules.

9. The method of claim 8, wherein the scoring program processes each reference mark field for each marked form and for each form adjusts the OMR target coordinates to correct for image distortions introduced in the scanning of the marked forms.

10. The method of claim 9, wherein the scoring program processes each OMR field to write as an output each field name, the zone coordinates, and the field value.

\* \* \* \* \*